US012798612B2

(12) United States Patent
Pullagurla et al.

(10) Patent No.: US 12,798,612 B2
(45) Date of Patent: Nov. 17, 2026

(54) METHODS AND SYSTEMS FOR VIRTUAL FENCE FORMULATION FOR AUTONOMOUS VEHICLES USING TEMPORARY BARRIERS

(71) Applicant: Torc Robotics, Inc., Blacksburg, VA (US)

(72) Inventors: Harish Pullagurla, Manor, TX (US); Jason Harper, Upper Arlington, OH (US); Paul Joseph Brown, Roanoke, VA (US); Ryan Chilton, Blacksburg, VA (US); Anjali Dhabaria, Blacksburg, VA (US); Mukhtar Maulimov, Cambridge, MA (US)

(73) Assignee: Torc Robotics, Inc., Blacksburg, VA (US)

(*) Notice: Subject to any disclaimer, the term of this patent is extended or adjusted under 35 U.S.C. 154(b) by 51 days.

(21) Appl. No.: 18/968,849

(22) Filed: Dec. 4, 2024

(65) Prior Publication Data

US 2026/0152206 A1 Jun. 4, 2026

(51) Int. Cl.
*B60W 60/00* (2020.01)
*B60K 35/00* (2024.01)

(52) U.S. Cl.
CPC ....... *B60W 60/001* (2020.02); *B60W 2552/50* (2020.02); *B60W 2556/10* (2020.02)

(58) Field of Classification Search
CPC .... B60W 60/001; B60W 50/10; G06V 20/20; G06V 20/582; G02B 27/0179; G01C 21/3461; E06B 9/70; G08G 1/096766; B60K 35/00
See application file for complete search history.

(56) References Cited

U.S. PATENT DOCUMENTS

| | | | | |
|---|---|---|---|---|
| 10,081,370 | B2 * | 9/2018 | Roth | B60W 50/10 |
| 10,150,473 | B2 | 12/2018 | Aharony et al. | |
| 10,282,999 | B2 | 5/2019 | Creusot | |
| 10,297,152 | B1 * | 5/2019 | Patel | G08G 1/096766 |
| 10,496,091 | B1 | 12/2019 | Ross et al. | |
| 11,293,767 | B2 * | 4/2022 | Kline | G01C 21/3461 |
| 12,391,271 | B2 * | 8/2025 | Chilton | G06V 20/582 |
| 2002/0170685 | A1 * | 11/2002 | Weik, III | E06B 9/70 160/133 |
| 2017/0242436 | A1 | 8/2017 | Creusot | |

(Continued)

OTHER PUBLICATIONS

General Traffic Cones Configuration. Traffic Safety Store (Year: 2021).*

(Continued)

Primary Examiner — Yuri Kan
(74) *Attorney, Agent, or Firm* — Armstrong Teasdale LLP

(57) ABSTRACT

An autonomy computing system of an autonomous vehicle for generating a virtual fence. The autonomy computing system receives data of a plurality of temporary barriers on a road based upon analysis of sensor data from one or more sensors of the autonomous vehicle, determines a closure intent associated with the plurality of temporary barriers exists, constructs a virtual fence associated with the plurality of temporary barriers, the virtual fence delineating a section of the road in which an autonomous vehicle is restricted from driving; and operates the autonomous vehicle based on the virtual fence.

20 Claims, 14 Drawing Sheets

(56) References Cited

U.S. PATENT DOCUMENTS

| | | | |
|---|---|---|---|
| 2019/0197891 | A1 | 6/2019 | Agarwal et al. |
| 2019/0220678 | A1 | 7/2019 | Guo et al. |
| 2020/0158523 | A1* | 5/2020 | Kline ................. G01C 21/3461 |
| 2020/0183157 | A1* | 6/2020 | Suzuki ............... G02B 27/0179 |
| 2021/0229691 | A1* | 7/2021 | Liu ........................ G06V 20/20 |
| 2021/0396540 | A1 | 12/2021 | Zhu |
| 2022/0080996 | A1 | 3/2022 | Brown et al. |
| 2023/0047336 | A1 | 2/2023 | Iglesias et al. |
| 2023/0331220 | A1 | 10/2023 | Ihlenburg et al. |
| 2023/0419678 | A1 | 12/2023 | Kabkab et al. |
| 2024/0391488 | A1 | 11/2024 | Yeh et al. |

OTHER PUBLICATIONS

Transportation Management Plans Design Manual. Chapter 5: Positive Protection (Temporary Barriers) (Year: 2019).*

* cited by examiner

METHODS AND SYSTEMS FOR VIRTUAL FENCE FORMULATION FOR AUTONOMOUS VEHICLES USING TEMPORARY BARRIERS

TECHNICAL FIELD

The field of the disclosure relates to autonomous vehicles and, in particular, to methods and systems for virtual fence formulation for autonomous vehicles.

BACKGROUND

In driving, an autonomous vehicle relies on the detection of lane markings to determine lane positions and is controlled to stay in the lane and between the lane markings. Lanes, however, may be changed due to reasons, such as construction and traffic control. Temporary barriers are placed on the road to indicate lane changes. Because the barriers are placed on a temporary, ad-hoc basis, the placement of the barriers may be irregular or does not necessarily conform to a predefined set of rules or specifications. Accordingly, there exists a need to derive a virtual fence from temporary barriers placed on the road to form changed lanes, and to update, based at least in part on the virtual fence, a travel path or a path on which the autonomous vehicle is guided to drive.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an autonomy computing system of an autonomous vehicle for generating a virtual fence, the autonomy computing system comprising at least one processor in communication with at least one memory device, the at least one processor programmed to: receive data of a plurality of temporary barriers on a road based upon analysis of sensor data from one or more sensors of the autonomous vehicle; determine a lane closure intent associated with the plurality of temporary barriers exists; construct a virtual fence associated with the plurality of temporary barriers, the virtual fence delineating a section of the road in which the autonomous vehicle is restricted from driving; and operate the autonomous vehicle based on the virtual fence.

In another aspect, a computer-implemented method for generating a virtual fence via an autonomous vehicle using at least one processor in communication with at least one memory, the method including: receiving data of a plurality of temporary barriers on a road based upon analysis of sensor data from one or more sensors of the autonomous vehicle; determining a lane closure intent associated with the plurality of temporary barriers exists; constructing a virtual fence associated with the plurality of temporary barriers, the virtual fence delineating a section of the road in which the autonomous vehicle is restricted from driving; and operating the autonomous vehicle based on the virtual fence.

In yet another aspect, one or more non-transitory computer-readable storage media for an autonomous vehicle, the one or more non-transitory computer-readable storage media comprising a plurality of instructions stored thereon that, in response to being executed, cause the autonomous vehicle to: receive data of a plurality of temporary barriers on a road based upon analysis of sensor data from one or more sensors of the autonomous vehicle; determine a lane closure intent associated with the plurality of temporary barriers exists; construct a virtual fence associated with the plurality of temporary barriers, the virtual fence delineating a section of the road in which the autonomous vehicle is restricted from driving; and operate the autonomous vehicle based on the virtual fence.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
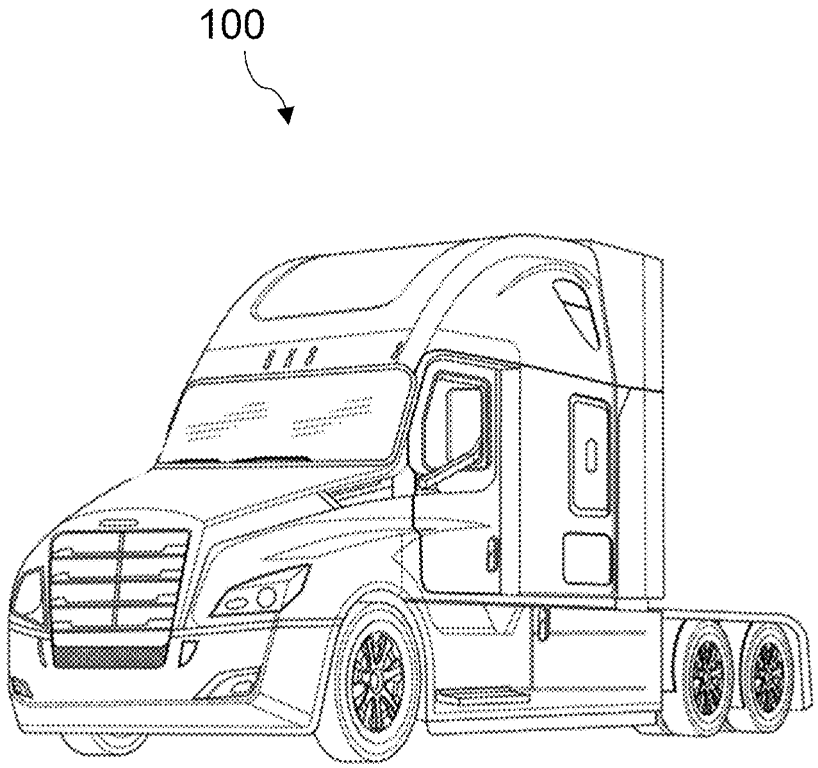
FIG. 1 is a schematic view of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

As described herein, one aspect of the surrounding environment of the autonomous vehicle is lane markings, sides of the road (also referred to as road sides), and objects present on or around a road surface. However, the lane markings and road sides become less relevant when, in construction or closure zones, certain lanes get blocked, or new lanes are created by placement of temporary barriers. As used herein, a temporary barrier refers to an object placed on a road to redirect the traffic to accommodate changes in road conditions, such as barrels, cones, and/or other barricades.

Autonomous vehicles employ technologies such as perception, localization, behaviors and planning, modeling, and control. Perception technologies enable an autonomous vehicle to sense and process its environment, to identify and classify objects, or groups of objects, in the environment, for example, pedestrians, vehicles, or features of a road being driven on. Localization technologies determine, based on the sensed environment, for example, where in the world, or on a map, the autonomous vehicle is located. Behaviors and planning technologies process data representing the sensed environment and localization or mapping data to plan maneuvers and routes to reach the planned destination for execution by a controller or a control module. Modeling technologies may be rules-based and may model virtual fences around detected objects. The autonomous vehicle may be programmed to not cross defined virtual fences. Controller technologies use control theory to determine how to translate desired behaviors and trajectories into actions undertaken by the vehicle through its dynamic mechanical components. This includes steering, braking and acceleration.

Perception technologies generally use sensors like a camera, a radio detection and ranging (RADAR) sensor, a light detection and ranging (LiDAR) sensor for detecting the surrounding environment of the autonomous vehicle. One aspect of the surrounding environment of the autonomous vehicle that needs attention is features of a road surface including lane markings and road sides, as well as objects present on or around the road surface. However, as described above, the lane markings and road sides become less relevant when, in construction or other closure zones, traffic is diverted to drive through temporary driving lanes created using construction/closure markers such as temporary barriers. Traffic cones are useful for directing traffic or marking off areas. They are also lightweight and easy to move, which makes them useful for temporary traffic control. Traffic barrels, also known as highway barrels, road drums, channelizer drums, highway drums, traffic drums, and/or just barrels, may be configured as a plastic drum channelizer barrier, and may be made from lightweight polyethylene with a sturdy/heavy base that made include recycled tires so no additional ballast is needed. Barricade "flasher" lights may be mounted on barrels (e.g., to the handle) for added visibility. Barrels are useful for freeways, interstates, and other high speed roadways.

In some embodiments, based on analysis of the sensor data, when a temporary barrier is identified as being physically connected, for example, due to proximity or based on other relatedness determinations, with another temporary barrier, the two connected temporary barriers are added as connected temporary barriers and implemented as defining a virtual fence functioning as a virtual barrier which the autonomous vehicle is not allowed to cross.

In some embodiments, based on analysis of sensor data from the one or more image sensors, the one or more LiDAR sensors, and/or the one or more RADAR sensors, and upon identifying more than one temporary barrier is present, the temporary barriers are mapped to a current travel path on a map. By way of a non-limiting example, positions of the temporary barriers on the current travel path on the map are mapped with detected positions of the temporary barriers in the environment or surrounding of the autonomous vehicle. As new temporary barriers are detected with the autonomous vehicle driving along a current travel path, the new temporary barriers are added in the order they appear on the current travel path. Further, based on certain criteria, each new temporary barrier is connected with a previously identified and added temporary barrier to generate a fence. The current travel path gets updated or revised based upon at least one of: (i) the identified and connected temporary barriers in order of their appearance along the driving path; (ii) a temporary barrier's distance relative to other neighboring temporary barriers and/or lane markings/road sides; (iii) an offset between a temporary barrier and aspects of a lane (e.g., a center or a lane); and/or (iv) an angle of a generated virtual fence.

It is a difficult task to use distance (e.g., such as offsets relative to a lane center and/or other lane marking/road sides) and/or map data to generate virtual fence geometries and make other determinations as to fence construction, especially in scenarios such as when a highway includes temporary barriers near an exit ramp. Additionally, there is always some degree of uncertainty as to the actual location of objects such as temporary barriers, especially in scenarios where the next temporary barrier may be a significant distance away (making it more difficult to perceive via the various sensors of the autonomous vehicle) and/or may be occluded/obstructed from detection by the various sensors of an autonomous vehicle.

In various embodiments described herein, one or more algorithms use heuristics to determine connectivity between temporary barriers in real-time to connect the placed temporary barriers to update a travel path of the autonomous vehicle in response to detected temporary barriers. The travel path may be based on the placement of temporary barriers within one or more traffic lanes of a travel surface such as a road surface. The temporary barriers may be identified using one or more image sensors, one or more light detection and ranging (LiDAR) sensors, or one or more radio detection and ranging (RADAR) sensors.

Compared to using machine learning techniques, the systems and methods of the present disclosure do not need training and are not as computationally heavy as some machine learning techniques. Training a machine learning model is computationally intensive and a machine learning model is typically pretrained before being deployed. Further, a relatively large data set that cover as many likely scenarios as possible is needed for training a model to result in a satisfactory accuracy. Such training data, however, is typically unavailable.

A rule-based method has its own challenges, as it is a difficult task to derive a set of rules that cover all situations that may be present during driving. For example, there may be a high degree of uncertainty in the detection of temporary barriers that are located at a significant distance from the autonomous vehicle and/or or due to occlusion of the temporary barriers. The systems and methods described herein provide a solution to these challenges by use of contextual data, such as maps, and rules that include additional criteria that go beyond solely relying on a distance between the temporary barriers. The solution described herein also utilizes existing temporary barriers and/or a detection history of temporary barriers to aid in determining a fence.

Various embodiments in the present disclosure are described with reference to FIGS. 1-8 below.

Figure 2:
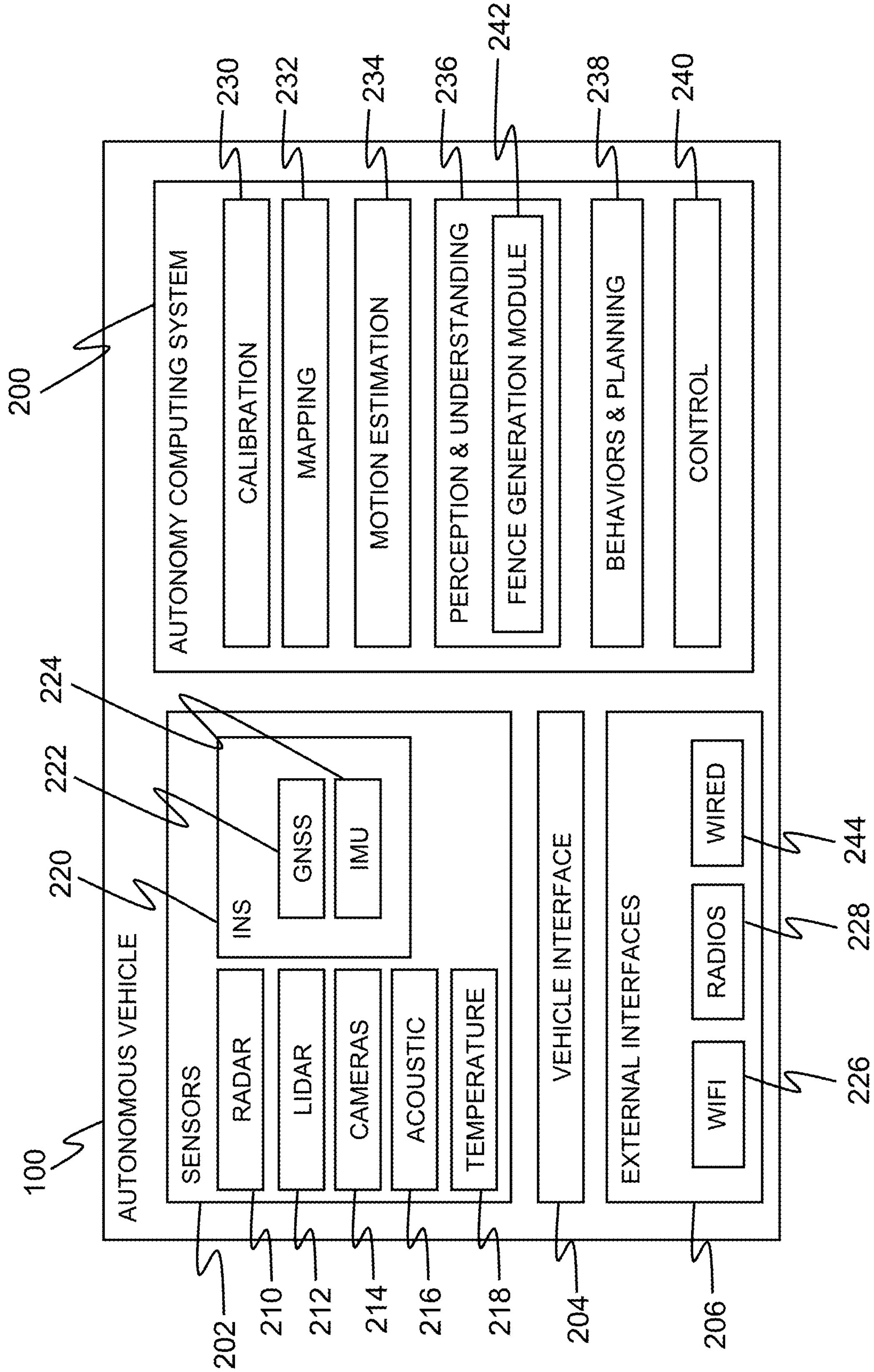
FIG. 2 is a block diagram of the autonomous vehicle shown in FIG. 1.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas in front of, to the side of, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras'FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas in front of, to the side of, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and fence generation module 242. Fence generation module 242, for example, may be embodied within another module, such as perception and understanding module 236, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Fence generation module 242 may perform one or more tasks including, but not limited to, generating one or more fences based upon temporary barriers identified by a module such as perception and understanding module 236, updating a travel path of autonomous vehicle 100 based upon the one or more fences, and transmitting the updated travel path to other modules of the autonomy computing system 200, or mission control, or both. Tasks performed by fence generation module 242 are described in more detail via FIG. 5 and FIGS. 6A-6F (described later), for example.

A plurality of rules may be stored within a memory of autonomy computing system 200 in connection with its various modules such as for fence generation module 242. These rules include but are not limited to intent determination rules and fence generation rules. Intent determination rules are configured to determine an intent of temporary barriers that are perceived by autonomy computing system 200. Fence generation rules are configured to generate a fence according to various factors, including but not limited to placement of the temporary barriers relative to each other and to other road features, and/or other aspects such as exit ramp data and map data. As described herein, the rules may be set and tested based on analysis of real-world log data including sensor data of autonomous vehicles and/or any other types of vehicles.

Autonomy computing system 200 of autonomous vehicle 100 may be completely autonomous (fully autonomous), semi-autonomous, or with any level of autonomy. In one example, autonomy computing system 200 can operate under Level 5 autonomy (e.g., full driving automation), Level 4 autonomy (e.g., high driving automation), Level 3 autonomy (e.g., conditional driving automation), Level 2 autonomy (e.g., partial driving automation), or Level 1 autonomy (e.g., driver assistance). As used herein the term "autonomous" includes fully autonomous, semi-autonomous, or having any level of autonomy.

Figure 3:
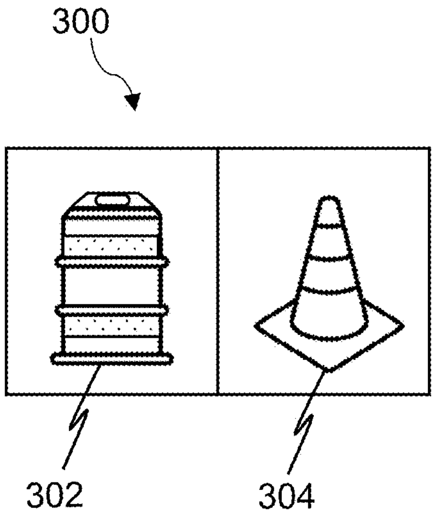
FIG. 3 is an example illustration of temporary barriers.

FIG. 3 is a table of example construction/closure markers 300, including a barrel 302 and a cone 304, which may be referred to herein as temporary barriers. A plurality of such construction/closure markers 300 may be used by road crews to close off lanes from travel or otherwise guide vehicles to certain paths on a roadway.

Figure 4:
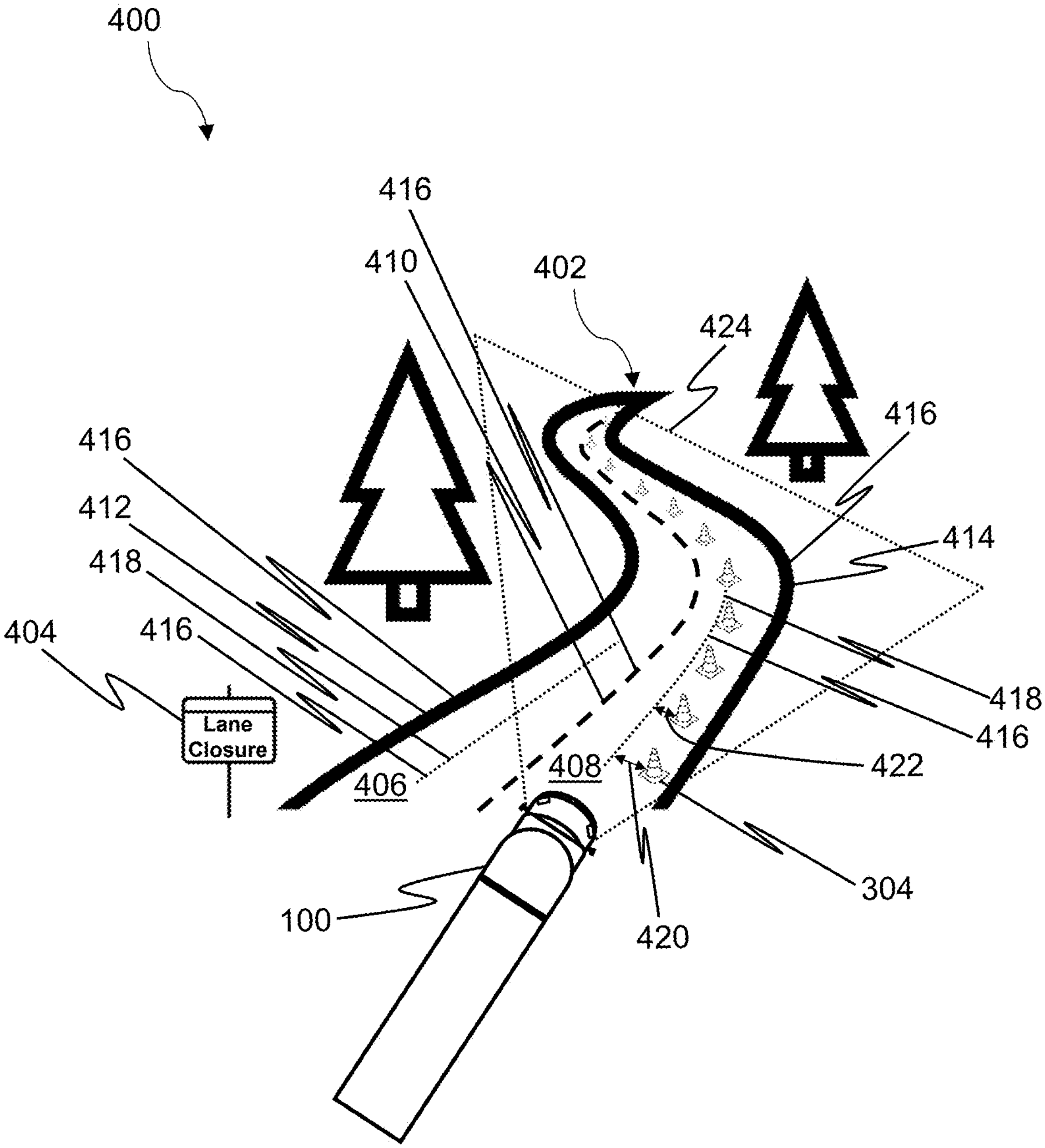
FIG. 4 is an example illustration of placement of temporary barriers on a road.

FIG. 4 is an example diagram of a road closure scenario 400 in which a plurality of construction/closure markers 300 in the form of cones 304 are used to form a barrier on a road 402. A temporary sign such as sign 404 (e.g., indicating "Lane Closure") may be placed near the start of the closure to provide additional warning to drivers. As shown in FIG. 4, road 402 may be a one-way road with two lanes 406 and 408 divided by lane marking 410, and cones 304 may be placed in one lane (e.g., 408) of road 402 to block or "fence" off that lane. For example, cones 304 may have been placed by a highway management authority in a tapered configuration from the rightward side of lane 408 toward lane marking 410. Road 402 may include sides 412 and 414, and each of lanes 406 and 408 may have a respective lane center. Distances relative to an offset reference 416, such as the center of the lane (e.g., lane 406, 408) may also be referred to herein as offsets. A portion of a lane center is shown in FIG. 4 as portion 418 in lane 406. In some embodiments, offset reference 416 may be a center of a lane, the same as or similar to portion 418 of the lane center of lane 406 as shown in FIG. 4. A subset of the offsets between cones 304 and the offset reference is depicted in FIG. 4 as offset 420 between the first cone in the series of cones 304 and offset reference 416, and offset 422 between the second cone in the series of cones 304 and offset reference 416, for example. In some embodiments, an offset reference 416 may include other lane aspects, such as lane sides and/or lane markings, for determining offsets of a temporary barrier 304. Offsets such as offsets 420, 422 may alternatively or additionally be determined, for example, by a distance comparison made between a corresponding temporary barrier such as a cone 304 and other lane aspects such as side 412 of road 402, side 414 of road 402, and/or lane marking 410 of road 402, in which case side 412, side 414, and/or lane marking 410 may function as an offset reference 416. Due to the tapered placement, the first cone of the plurality of cones 304 may have a first distance from lane marking 410, whereas the second cone of the plurality of cones 304 may have a different (e.g., second) distance from lane marking 410, where the distance between the second cone 304 and lane marking 410 is less than the distance between first cone 304 and lane marking 410, and so on and so forth for each successive cone. Side 412 may generally be opposite side 414. For example, side 412 may be a first or left side of road 402, and side 414 may be a second or right side of road 402. As shown in FIG. 4, the distance between each successive cone 304 of the plurality of cones relative to lane marking 410 may decrease until the cones meet lane marking 410 (e.g., effectively no distance between a cone and lane marking 410) (cones 304 may also cross lane marking 410 in some embodiments). Correspondingly, the distance between each successive cone 304 and side 414 increases as the taper increases toward lane marking 410. Additionally, within the plurality of cones 304 shown in FIG. 4, cones 304 that are farther down road 402 may appear smaller in size than cones 304 near sign 404, for example. The diminishing perspective is another aspect that autonomous vehicle 100 needs to account for when making determinations as to intent, as described herein. The response by autonomous vehicle 100 to scenarios such as that shown in FIG. 4 and additional scenarios is described in more detail below. In the present disclosure, lane markings such as lane marking 410 on the road surface may be lines painted on, printed on, or otherwise formed in/on the road surface.

Field of view (FOV) 424 of autonomous vehicle 100 illustrates how autonomous vehicle 100 may perceive road 402. FOV 424 may be capable of detection up to a certain distance, which may be based on detection limits of the various sensors 202. While FOV 424 is shown as having a conical shape, this is not limiting and is only a depiction of an example FOV of autonomous vehicle 100. In some embodiments, and depending on the type of sensor 202, FOV 424 may effectively be 360 degrees.

Figure 5:
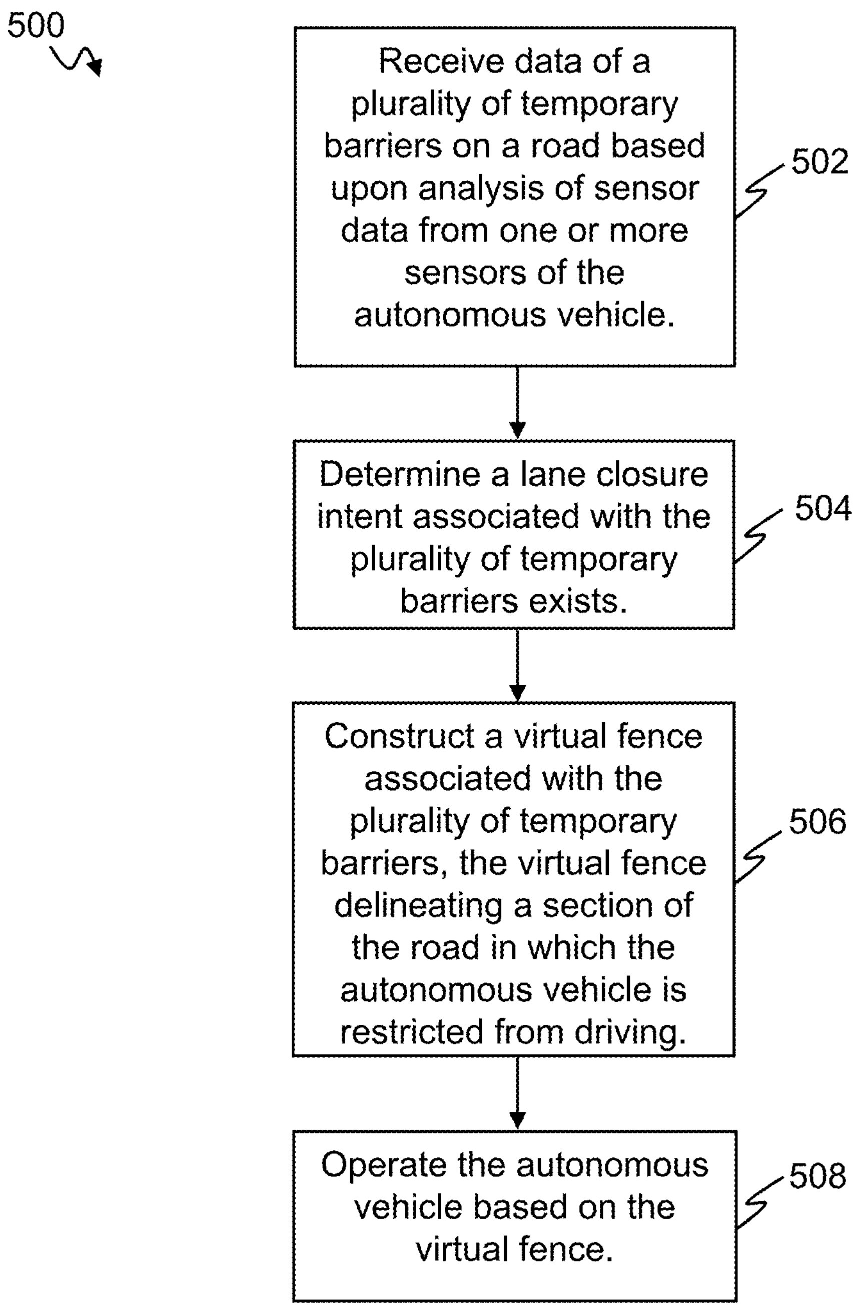
FIG. 5 is a flow-chart of method operations performed by an autonomy computing system shown in FIG. 2.

FIG. 5 is an example flowchart of method 500 performed by autonomy computing system 200 or its modules (shown in FIG. 2). Method 500 includes receiving 502 data of a plurality of temporary barriers on a road based upon analysis of sensor data from one or more sensors of the autonomous vehicle. Temporary barriers may include barrels 302 and/or cones 304 as shown in FIG. 3. If only one temporary barrier is detected as present on the road, then the temporary barrier may not be considered to be indicative that autonomous vehicle 100 is approaching a construction/closure zone. Put another way, fence generation module 242 may not infer an intent if only one temporary barrier is perceived by perception and understanding module 236 via detection outputs from sensors 202. However, based on sensor data of sensors 202 (e.g., data of cameras 214, LiDAR sensors 212, or RADAR sensors 210), and based upon detecting that more than one temporary barrier (or any predetermined number of temporary barriers) are detected as present, autonomy computing system 200 or its modules (shown in FIG. 2, for example fence generation module 242) may identify that autonomous vehicle 100 is approaching a construction/closure zone. For example, as shown in FIG. 4, a plurality of temporary barriers (e.g., cones 304) may be used to temporarily taper off and close a lane in a construction/closure zone. However, each temporary barrier of the plurality of temporary barriers needs to be connected in a relational manner to at least one other temporary barrier in order for the temporary barriers to be construed as a string of temporary barriers to trigger generation of a virtual fence. As described herein, a temporary barrier numbered “1” may be the first temporary barrier detected in the sensor data in the direction of travel of autonomous vehicle 100. As autonomous vehicle 100 travels further, temporary barriers numbered “2,” “3,” “4,” “5” . . . “n” may be detected and analyzed in connection with determining an intent of the temporary barriers.

Method 500 also includes determining 504 a lane closure intent associated with the plurality of temporary barriers exists. Upon detecting at least two temporary barriers, for example, temporary barriers numbered “1” and “2,” autonomy computing system 200 (or its one or more modules) may refer to set of rules stored within a memory of autonomy computing system 200. The rules may define how fence generation module 242 interprets the intent of the temporary barriers for purposes of defining and generating a virtual fence relative to positions of the temporary barriers.

Method 500 further includes constructing 506 a virtual fence associated with the plurality of temporary barriers, the virtual fence delineating a section of the road in which the autonomous vehicle is restricted from driving. Fence generation module 242 may output a fence control scheme to other modules within autonomy computing system 200 so that autonomous vehicle 100 is driven in accordance with the defined fence. A plurality of fence geometry rules stored in a memory of autonomy computing system 200 may be referred to in generating a fence control scheme. The fence geometry rules may have been generated based, for example, on real-world data from logs of test runs of autonomous vehicle 100 as well as stored data reflecting parameters of the type of temporary barrier detected. The data may include known widths of temporary barriers, such as a width of a barrel such as barrel 302 shown in FIG. 3. Fence geometry may further be determined and based on relative positions of temporary barriers to one another, including distance and angle, and their respective locations relative to lane markings (e.g., a center line such as lane marking 410 shown in FIG. 4) and road sides (e.g., sides or edges of the road such as sides 412 and 414 shown in FIG. 4). Method 500 may further include, for example, as part of constructing 506 a virtual fence, using history of fence determination. Constructing 506 may include detecting new temporary barriers as autonomous vehicle 100 travels down the road, and updating the fence based on the new temporary barriers if the new temporary barriers are determined (e.g., determining 504) to be intended to be a continuation of the fence. If either (i) the new temporary barrier is not determined to be a continuation of the existing fence, or (ii) no new temporary barriers are detected, the fence may be ended, and autonomous vehicle 100 may be operated without a fence, or a new fence may be generated. In some embodiments, based on analysis of the sensor data and upon identifying that more than one temporary barriers are present, the new temporary barriers are added in the order they appear to the current fence.

Method 500 yet further includes operating 508 the autonomous vehicle based on the virtual fence. Once a fence is applied, autonomous vehicle 100 will navigate in a manner where autonomous vehicle 100 is not permitted to cross a defined fence. This may mimic, for example, a human driver not passing between barrels located on a road surface because the human driver knows that the intent of the barrels is to block off certain portions of the road from vehicles.

FIGS. 6A to 6E are illustrations of various example lane closure scenarios in which temporary barriers have been placed on a road, and how autonomous vehicle 100 determines how to navigate relative to the temporary barriers and the intent thereof.

Figure 6A:
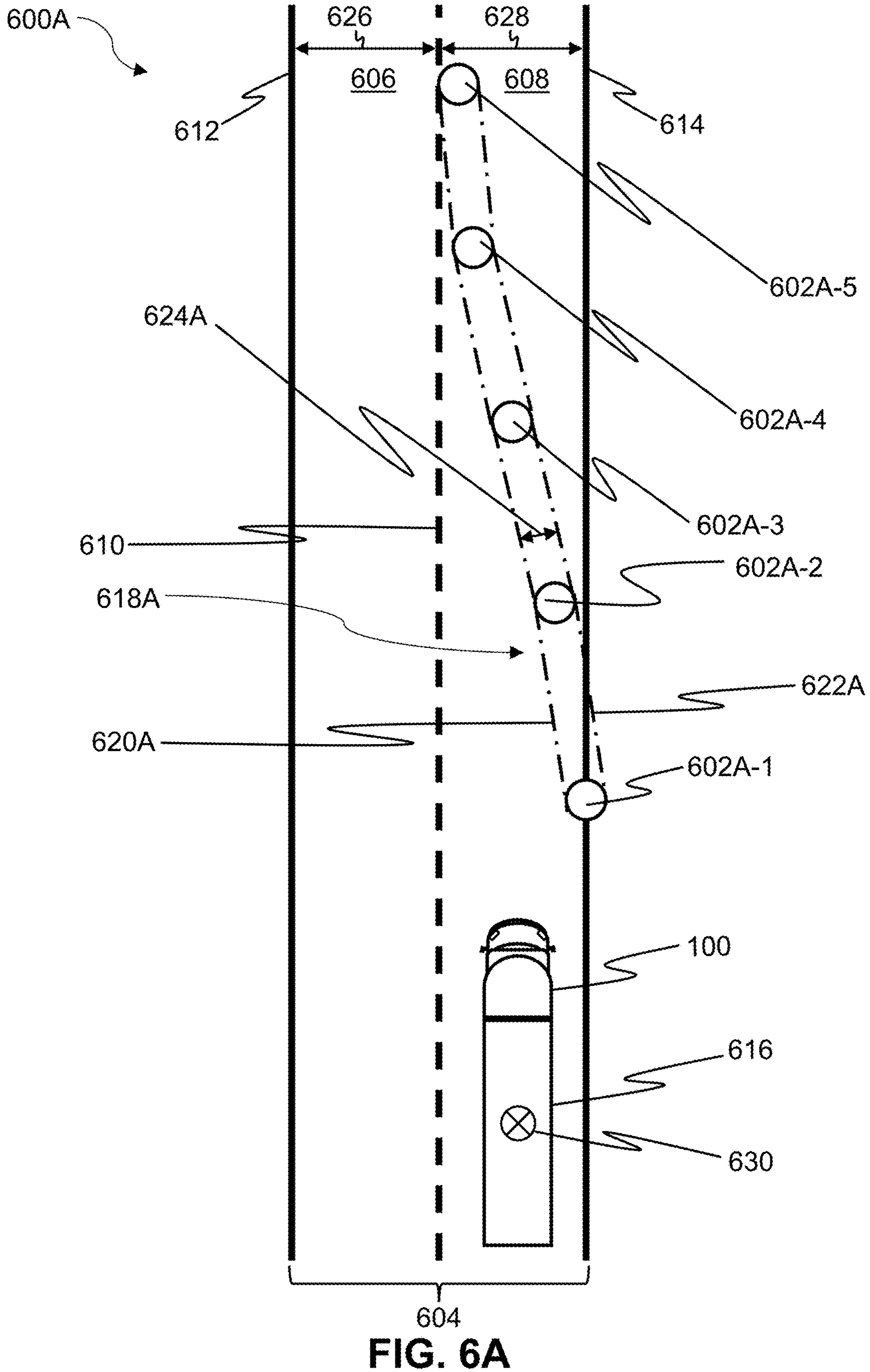
FIG. 6A is an example illustration of temporary barriers in a taper into lane configuration according to one embodiment of the present disclosure.

FIG. 6A is an illustration of an example lane closure scenario 600A in which temporary barriers 602A-1 to 602A-5 have been placed on a road 604 which has two lanes 606 and 608, for example. As shown in FIG. 6A, temporary barriers 602A-1 to 602A-5 may be placed on road 604, and in particular within lane 608. More specifically, temporary barriers 602A-1 to 602A-5 may be placed in such a manner so as to taper into lane 608 from a side of road 604. As shown in FIG. 6A, lanes 606 and 608 of road 604 may be divided by a lane marking 610. Lane marking 610 may, in the case of a two-lane road or highway, generally define a center point of a two-lane road such as road 604 that has lanes 606 and 608, and/or serve as a divider of adjacent lanes for a road with multiple (e.g., more than two) lanes. There may be more than one lane marking 610 if more than two lanes are present. Temporary barriers 602A-1 to 602A-5 may be placed within lane 608 to gradually block or fence off lane 608.

Autonomous vehicle 100 including trailer 616 may approach, in order, temporary barrier 602A-1, temporary barrier 602A-2, temporary barrier 602A-3, temporary barrier 602A-4, and then temporary barrier 602A-5, where each temporary barrier 602A-1 to 602A-5 may be detected by sensors 202 and captured in sensor data of cameras 214, LiDAR sensors 212, or RADAR sensors 210, for example. Fence generation module 242 processes each detected temporary barrier and the corresponding data thereof to generate fence 618A relative to temporary barriers 602A-1 to 602A-5. This may include determining a width of any one temporary barrier, a distance between neighboring temporary barriers, and offsets between each temporary barrier and aspects of road 604 such as a lane center of lane 608 (e.g., a lane center similar to lane center 418 in FIG. 4 and/or lane center 638 in FIG. 6F, described later), or road sides 612, 614. Fence 618A is a virtual fence generated by fence generation module 242 and represents a restricted, or "no-go," region in which autonomous vehicle 100 is not permitted to pass through, and/or must stay a particular distance away from. Fence 618A may be bounded by fence boundary 620A and fence boundary 622A. In one embodiment, each fence boundary 620A, 622A is defined relative to a detected side of the temporary barriers, such that a width 624A of fence 618A may approximate or may be effectively equal to the width of the corresponding temporary barrier, as shown in FIG. 6A. In other embodiments, the width of fence 618A may be determined using other parameters. For example, while temporary barriers 602A-1 to 602A-5 are intended to reflect temporary barriers of the same type (e.g., barrels such as barrel 302 shown in FIG. 3), it may be the case that temporary barriers 602A-1 to 602A-5 are a mix of different temporary barriers (e.g., see construction/closure markers 300 including barrels 302 and cones 304 shown in FIG. 3) having varying widths. In such a case, the width of fence 618A may be set according to the width of any temporary barrier having the largest width, an individualized width for each detected temporary barrier, or a running average width representing an average width of the determined widths of the detected temporary barriers. Fence boundaries 620A, 622A may alternatively or additionally be defined by other parameters. For example, instead of defining fence 618A based on detected sides of a temporary barrier, fence boundaries 620A, 622A may be defined based on a known standard size of the temporary barrier type of the detected temporary barriers 602A-1 to 602A-5.

Determination of the intent of the temporary barriers and fence geometry is based on the distance between neighboring barriers, offsets, and context (e.g., angles, map data, exit ramps). For example, to determine if a given temporary barrier should be included in a fence, a determination is made as to whether the temporary barrier meets (i) a threshold distance between adjacent temporary barriers, and (ii) a threshold offset relative to a lane center. These factors, when taken in combination with context such as environmental context (e.g., map data, nearby exit ramps), defines which temporary barriers will be included in a given fence. Autonomous vehicle 100 may refer to rules and/or other data and information regarding characteristics of known temporary barriers stored within a memory of or associated with autonomous vehicle 100, such as a memory within or associated with autonomy computing system 200. These characteristics may be defined by local authorities (e.g., certain geographical areas and/or territories may use temporary barriers of a certain type with a certain shape and size), industry standards, and/or other data points and/or information. Standard sizes and/or other temporary barrier traffic control rules of the territory in which autonomous vehicle 100 is being driven may be programmed into the intent determination rules of autonomy computing system 200 and utilized by its various modules (e.g., modules 236, 238, 242) to determine an intent of any detected temporary barriers. Similarly, the fence generation rules of autonomy computing system 200 may be programmed to include standard road and/or lane widths for a plurality of territories, and, in conjunction with live measurements from sensors 202 and/or GPS and/or other map data, the various modules (e.g., modules 236, 238, 242) may be able to determine lane widths 626 and 628 according to the rules for use in generating a virtual fence.

Additionally, a first temporary barrier in a sequence of temporary barriers that is determined to define a fence may be used to define the characteristics of the fence. For example, if a barrel such as a barrel 302 is the first temporary barrier, the width of the corresponding fence may be defined as characteristics of that barrel. If the next temporary barrier within the same group of temporary barriers defining the fence is determined to be another barrel, then the width of the fence may be kept the same. If, however, any next temporary barrier is determined to be a different temporary barrier type such as a cone 304, then the fence may be adjusted in width according to rules relating to a cone. Alternatively, because a cone 304 will generally have a smaller size than a barrel 302, a fence that is defined by a first-detected temporary barrier that was a barrel may disregard the (e.g., smaller) width of any next cone 304 and keep the width of the fence set based on the wider width of the barrel. Yet further, the fence may be constructed by connecting the edges of the barriers on both sides without regard to a width of the barriers. As a further example, a fence defined and based only on detected cones such as cones 304 may have a thinner width than a fence defined and based only on detected barrels such as barrels 302. Autonomous vehicle 100, via autonomy computing system 200, is configured to be able to define a fence based on any variety of the parameters and adjust the fence on the fly.

As shown in FIG. 6A, each temporary barrier 602A-1 to 602A-5 has a certain position within lane 608 relative to road side 614 and lane marking 610 within width 628 of lane 608. Determinations and calculations made relative to autonomous vehicle 100 (and trailer 616) and the various detected temporary barriers (e.g., 602A-1 to 602A-5) may be made relative to a certain point of autonomous vehicle 100 and/or trailer 616, such as a reference point 630 thereof. In the scenario shown in FIG. 6A, starting at temporary barrier 602A-1, the temporary barriers gradually taper from road side 614 into lane 608 until lane marking 610 is reached. In one embodiment, a reference such as reference point 630 is used as a point from which to base certain measurements and related determinations and/or calculations from. For example, reference point 630 may provide a frame of reference for the overall shape and length of autonomous vehicle 100 and trailer 616 in connection with navigating relative to fence 618A. Reference point 630 may be used relative to temporary barriers 602A-1 to 602A-5, lane marking 610, road sides 612/614, fence boundaries 620A/622A, and/or lane widths 626/628 for purposes of driving autonomous vehicle 100 in a manner that corresponds to the "no-go" region defined by fence 618A.

In some embodiments, reference point 630 may be a center point of the overall tractor/trailer which includes autonomous vehicle 100 and trailer 616. For example, a total length and/or total width of autonomous vehicle 100 and trailer 616 may be determined and/or known and a center point thereof may be used as reference point 630 to provide a basis for making determinations and calculations relating to maneuvering autonomous vehicle 100 and trailer 616 relative to fence 618A. In other embodiments, reference point 630 may instead a point at some other location of autonomous vehicle 100 and/or trailer 616. In some other embodiments, reference point 630 may be a plurality of points distributed relative to the body of autonomous vehicle 100 and/or trailer 616. For example, one point may be defined at the front of autonomous vehicle 100, and another at the end of trailer 616, and these two points may then be used for purposes of navigating relative to fence 618A and/or defining other operating parameters.

Figure 6B:
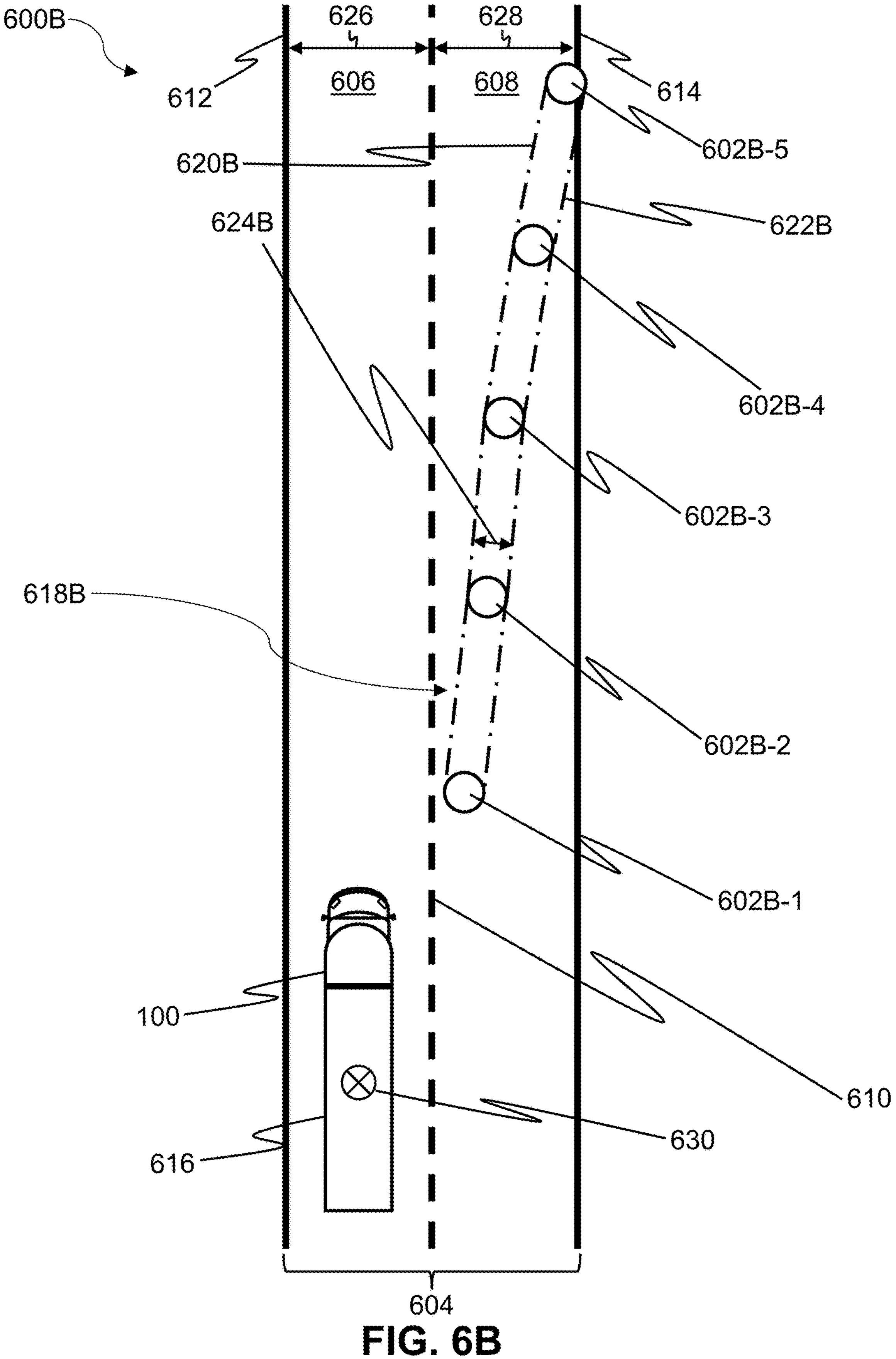
FIG. 6B is an example illustration of temporary barriers in a taper out of lane configuration according to one embodiment of the present disclosure.

FIG. 6B is an illustration of an example lane closure scenario 600B in which temporary barriers 602B-1 to 602B-5 have been placed on a road 604 which has two lanes 606 and 608, for example. Like elements from FIG. 6A may not be discussed in the same level of detail in connection with FIG. 6B. As shown in FIG. 6B, temporary barriers 602B-1 to 602B-5 may be placed on road 604, and in particular within lane 608. More specifically, temporary barriers 602B-1 to 602B-5 may be placed in such a manner so as to taper out of lane 608 (e.g., tapering out from at or near lane marking 610 to road side 614).

Autonomous vehicle 100 including trailer 616 may approach, in order, temporary barrier 602B-1, temporary barrier 602B-2, temporary barrier 602B-3, temporary barrier 602B-4, and then temporary barrier 602B-5, where each temporary barrier 602B-1 to 602B-5 may be detected by sensors 202 and captured in sensor data of cameras 214, LiDAR sensors 212, or RADAR sensors 210, for example. Fence generation module 242 processes each detected temporary barrier and the corresponding data thereof to generate fence 618B. Fence 618B may be bounded by fence boundary 620B and fence boundary 622B. Distances between adjacent barriers 602B-1 through 602B-5 may be measured and used by fence generation module 242 to make a determination that barriers 602B-1 to 602B-5 should be part of the same fence 618B.

Figure 6C:
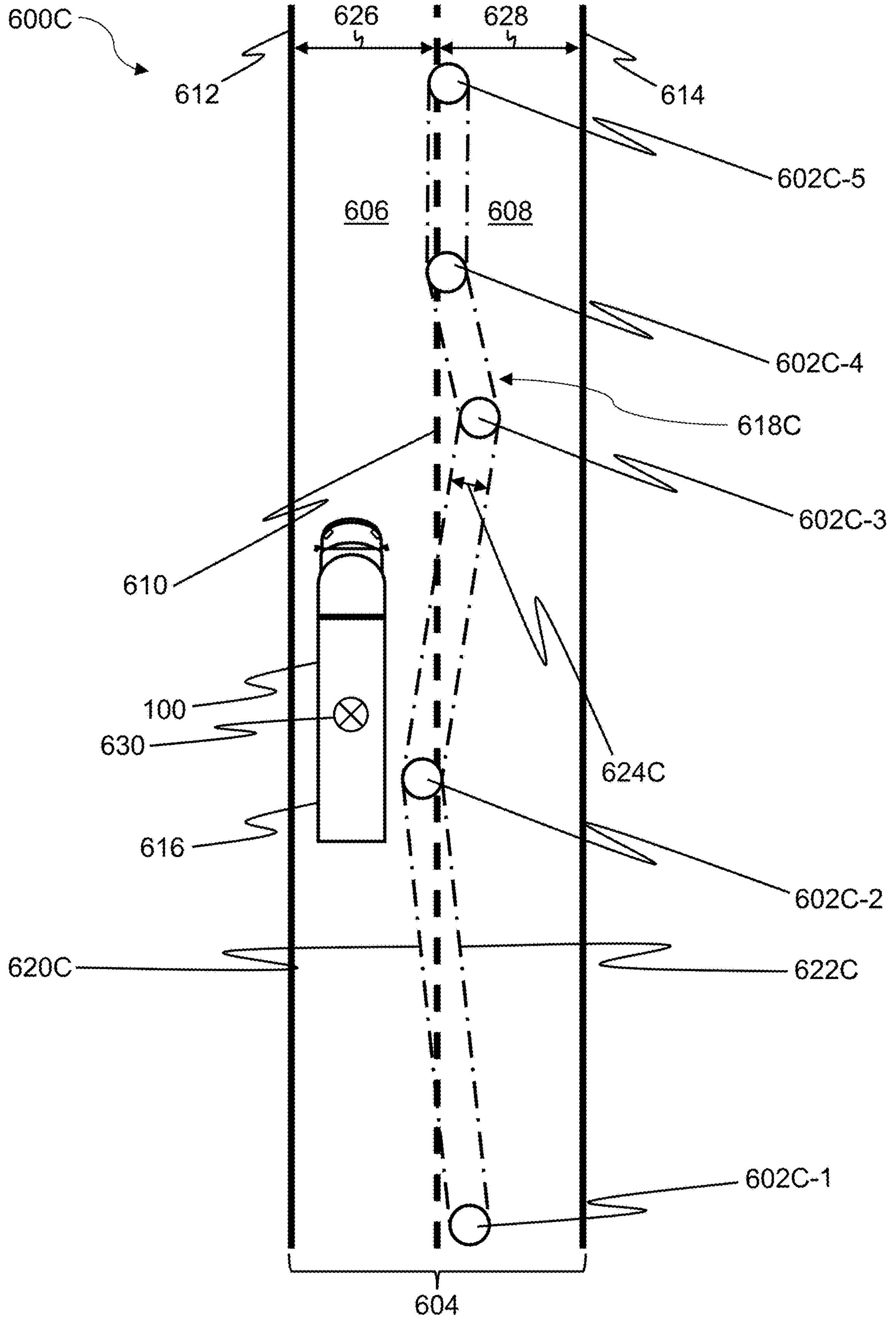
FIG. 6C is an example illustration of temporary barriers in a near lane marking configuration according to one embodiment of the present disclosure.

FIG. 6C is an illustration of an example lane closure scenario 600C in which temporary barriers 602C-1 to 602C-5 have been placed on a road 604 which has two lanes 606 and 608, for example, near a lane marking. Like elements from FIGS. 6A, 6B may not be discussed in the same level of detail in connection with FIG. 6C. As shown in FIG. 6C, temporary barriers 602C-1 to 602C-5 may be placed on road 604, and in particular within lanes 606 and/or 608. More specifically, temporary barriers 602C-1 to 602C-5 may be placed in such a manner so as be near a lane line such as lane marking 610, such that some temporary barriers of temporary barriers 602C-1 to 602C-5 may be all or partially within one lane, and other temporary barriers of temporary barriers 602C-1 to 602C-5 may be all or partially within the other lane. For example, as shown in FIG. 6C, the majority of the body of temporary barrier 602C-2 is within lane 606, while a portion of the body of temporary barrier 602C-2 straddles lane marking 610 and partially extends into lane 608.

Autonomous vehicle 100 including trailer 616 may approach, in order, temporary barrier 602C-1, temporary barrier 602C-2, temporary barrier 602C-3, temporary barrier 602C-4, and then temporary barrier 602C-5, where each temporary barrier 602C-1 to 602C-5 may be detected by sensors 202 and captured in sensor data of cameras 214, LiDAR sensors 212, or RADAR sensors 210, for example. Fence generation module 242 processes each detected temporary barrier and the corresponding data thereof to generate fence 618C. Fence 618C may be bounded by fence boundary 620C and fence boundary 622C. Angle measurements and determinations may be utilized by fence generation module 242 to determine that barrier 602C-3 is part of fence 618C because an angle of fence boundaries 620C/622C near barrier 602C-3 is within an acceptable threshold as compared to angle measurements for barriers 602C-a and/or 602C-2.

Figure 6D:
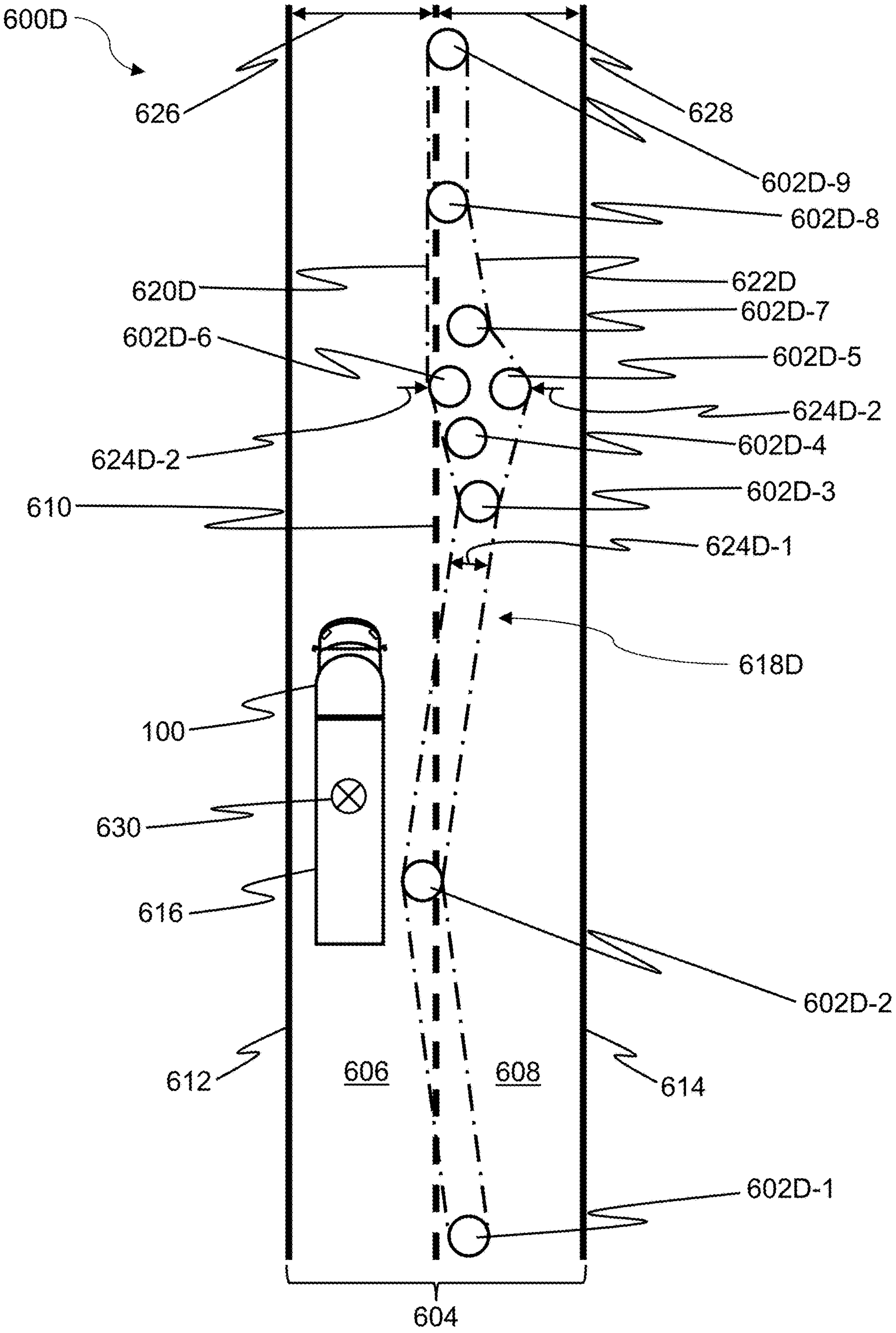
FIG. 6D is an example illustration of temporary barriers in a cluster configuration according to one embodiment of the present disclosure.

FIG. 6D is an illustration of an example lane closure scenario 600D in which temporary barriers 602D-1 to 602D-9 have been placed on a road 604 which has two lanes 606 and 608, for example. Like elements from FIGS. 6A to 6C may not be discussed in the same level of detail in connection with FIG. 6D. As shown in FIG. 6D, temporary barriers 602D-1 to 602D-9 may be placed on road 604, and in particular within lanes 606 and/or 608. More specifically, temporary barriers 602D-1 to 602D-9 may be placed in such a manner so as be near a lane line such as lane marking 610, but with a cluster of temporary barriers which may include temporary barriers 602D-3 to 602D-7. Within the cluster, some temporary barriers of temporary barriers 602D-1 to 602D-9 may be all or partially within one lane, and other temporary barriers of temporary barriers 602D-1 to 602D-9 may be all or partially within the other lane. For example, as shown in FIG. 6D, the majority of the body of temporary barrier 602D-2 is within lane 606, while a portion of the body of temporary barrier 602D-8 straddles lane marking 610 and a majority of the body of temporary barrier 602D-8 extends into lane 608. Also, the majority of the temporary barriers within tight cluster of temporary barriers 602D-3 to 602D-7 is present in lane 608. The fence near the cluster of barriers 602D-3 to 602D-7 may be generated based on at least one of distances between each barrier, offsets of each barrier relative to a center of lane 606 and/or 608, and/or an angle of a portion of the fence, such as an angle of a prior portion of the fence near barrier 602D-2. The fence 618D is defined such that the cluster of temporary barriers 602D-3 to 602D-7 are within fence boundaries 620D, 622D.

Autonomous vehicle 100 including trailer 616 may approach, in order, temporary barrier 602D-1, temporary barrier 602D-2, temporary barrier 602D-3, temporary barrier 602D-4, temporary barrier 602D-5, temporary barrier 602D-6, temporary barrier 602D-7, temporary barrier 602D-8, and then temporary barrier 602D-9, where each temporary barrier 602D-1 to 602D-9 may be detected by sensors 202 and captured in sensor data of cameras 214, LiDAR sensors 212, or RADAR sensors 210, for example. Fence generation module 242 processes each detected temporary barrier and the corresponding data thereof to generate fence 618D. Fence 618D may be bounded by fence boundary 620D and fence boundary 622D. Barrier 602D-5 may be determined to be a part of fence 618D due to its distance relative to barriers 602D-4, 602D-6, and/or 602D-7. For example, determining that barrier 602D-5 is part of fence 618D may also be based on extrapolations from previous barriers, such as the relationship between barriers 602D-3 and 602D-4.

Figure 6E:
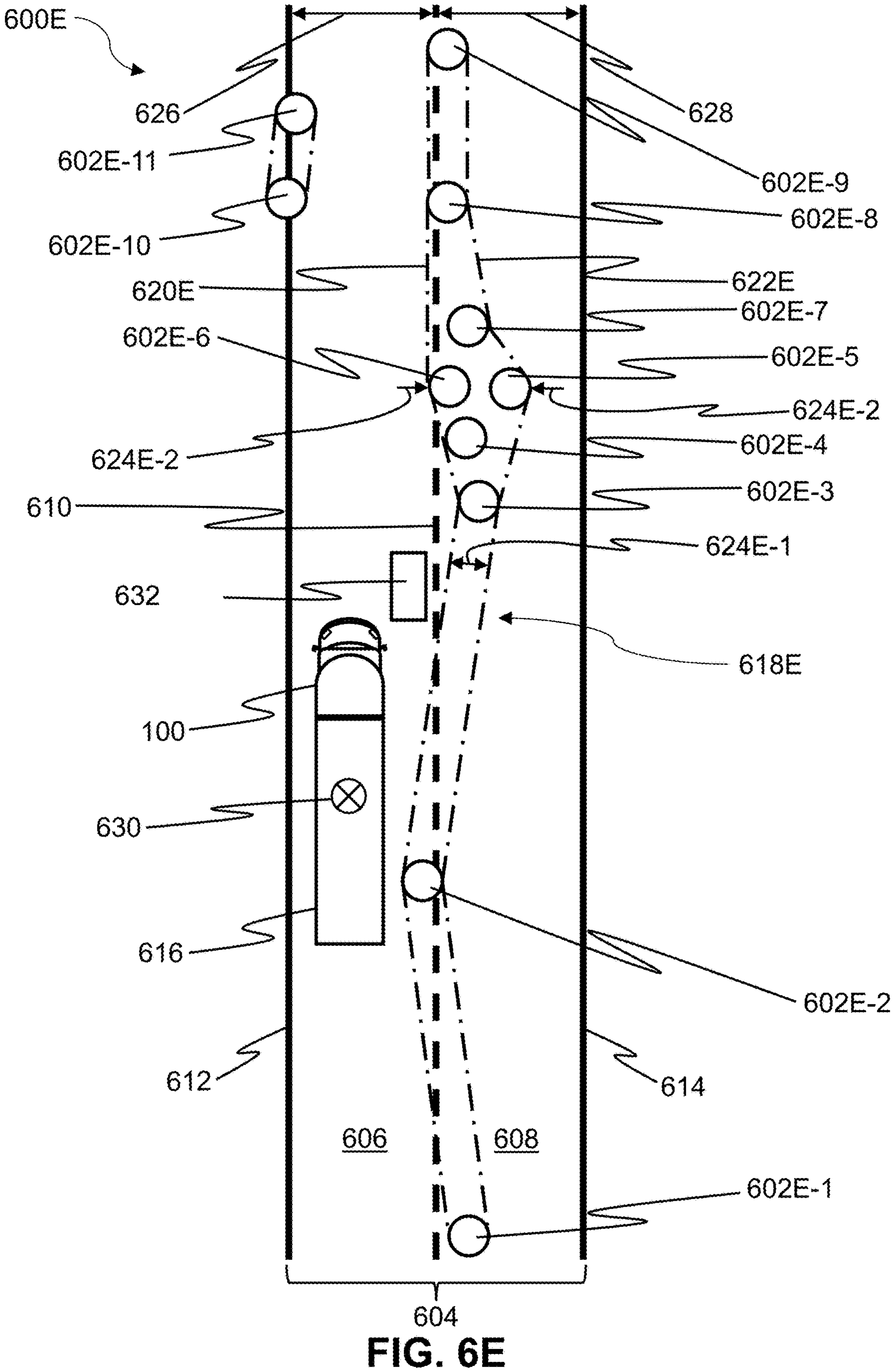
FIG. 6E is an example illustration of additional objects present on a road according to one embodiment of the present disclosure.

FIG. 6E is an illustration of an example lane closure scenario 600E in which temporary barriers 602E-1 to 602E-9 have been placed on a road 604 which has two lanes 606 and 608, for example, but there are additional objects such as additional temporary barriers present in the road that autonomous vehicle 100 needs to determine how to react to. Like elements from FIGS. 6A to 6D may not be discussed in the same level of detail in connection with FIG. 6E. Scenario 600E is similar to scenario 600D shown in FIG. 6D except that additional temporary barriers 602E-10, 602E-11, and an object 632 are present on road 604. Temporary barriers 602E-10 and 602E-11 may be the same type of barrier as temporary barriers 602E-1 to 602E-9, such as barrels of the kind shown in FIG. 3 (e.g., barrel 302). However, temporary barriers 602E-10 and 602E-11 are not adjacent temporary barriers 602E-1 to 602E-9 in the same manner each temporary barrier of temporary barriers 602E-1 to 602E-9 are. Rather, temporary barriers 602E-10 and 602E-11 are on the side of road 604 adjacent road side 612, whereas temporary barriers 602E-1 to 602E-9 are adjacent lane marking 610 and/or road side 614. Offset measurements and determinations by fence generation module 242 may serve as a basis for: (i) excluding temporary barriers 602E-10 and 602E-11 from the fence 618E, and (ii) defining a separate fence for temporary barriers 602E-10 and 602E-11. Similarly, object 632 may be excluded from the fences shown in FIG. 6E. based on offset/angle/distance measurements and determinations performed by fence generation module 242. In the case of temporary barriers 602E-10 and 602E-11, while perception and understanding module 236 may perceive temporary barriers 602E-10 and 602E-11 as being of the same type of temporary barriers 602E-1 to 602E-9, fence generation module 242 may, based at least on the offsets of temporary barriers 602E-10 and 602E-11, determine that temporary barriers 602E-10 and 602E-11 should not be treated as being part of temporary barriers 602E-1 to 602E-9 and/or fence 618E. Rather, temporary barriers 602E-10 and 602E-11 may be treated as being discrete objects with no defined intent, or may be determined to be part of their own separate fence. Either way, autonomous vehicle 100 will avoid crossing fence 618E and avoid hitting temporary barriers 602E-10 and 602E-11 and/or crossing any fence determined to have been created by temporary barriers 602E-10 and 602E-11, such that autonomous vehicle 100 will drive between fence boundary 620E of fence 618E and a rightward of temporary barriers 602E-10 and 602E-11 and any fence thereof.

Additionally, there may be another object 632 present on the road, such as within lane 606. However, object 632 is not a temporary barrier, and may instead be an object such as a box that may have fallen off of a vehicle transporting the box. Therefore object 632 does not need to be treated as a “no-go” zone in the same manner as temporary barriers 602E-1 to 602E-9, and is not part of fence 618E or the fence associated with temporary barriers 602E-10 and 602E-11. Autonomous vehicle 100 may swerve or even cross object 632 once it has been determined that there is not construction/closure intent associated with object 632.

Figure 6F:
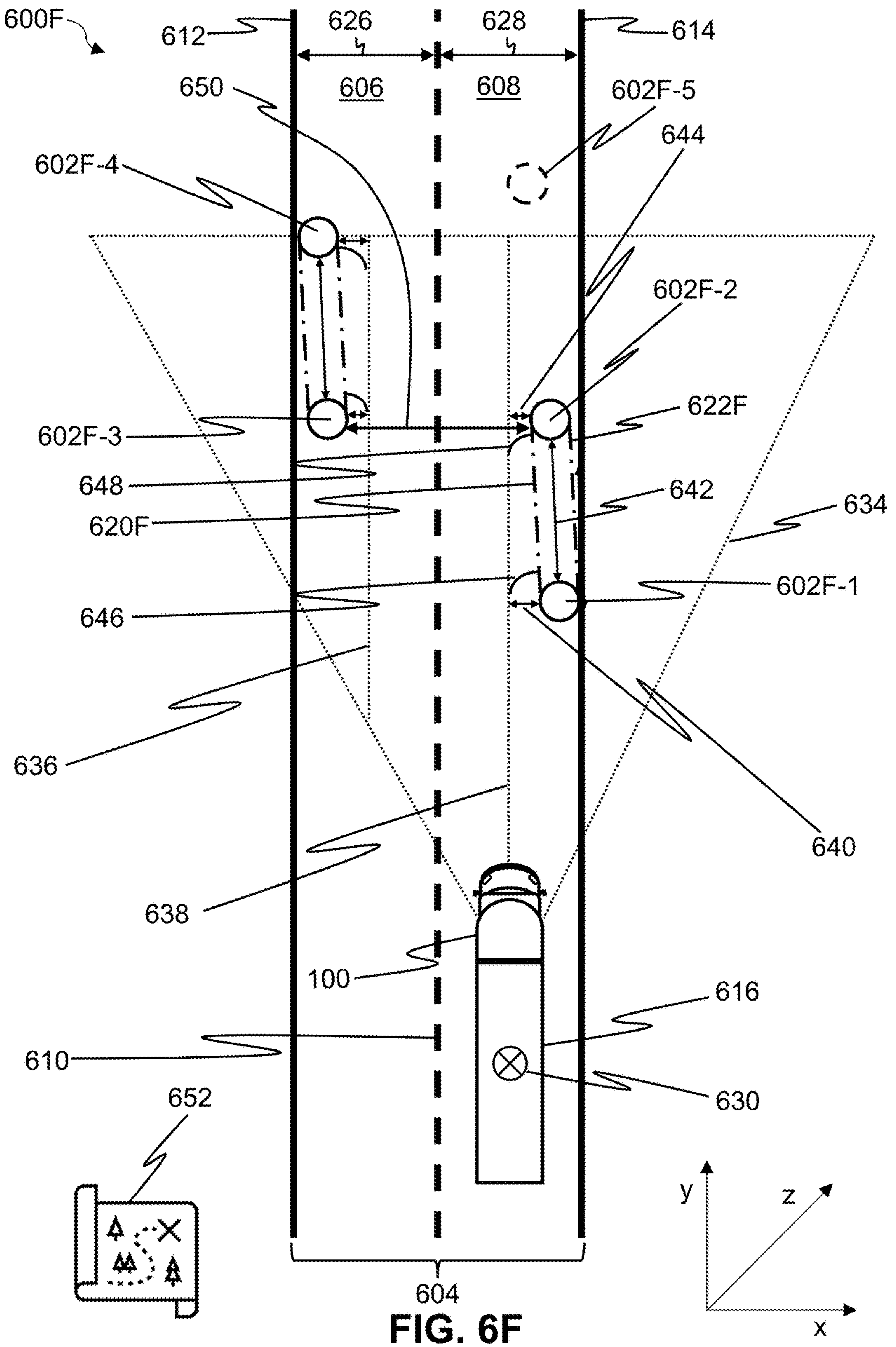
FIG. 6F is an example illustration of a fence determination technique according to one embodiment of the present disclosure.

FIG. 6F is an illustration of an example fence calculation scenario 600F. FIG. 6F refers to certain common elements as shown in and described in connection with FIGS. 6A to 6E. Field of view (FOV) 634 of autonomous vehicle 100 illustrates how autonomous vehicle 100 may perceive road 604. While FOV 634 is show as having a conical shape, this is not limiting and is only a depiction of an example FOV of autonomous vehicle 100. In some embodiments, and depending on the type of sensor 202, FOV 634 may effectively be 360 degrees. Objects within FOV 634 may be detected up to a certain distance, which may be based on detection limits of the various sensors 202. Within FOV 634, autonomous vehicle 100 may detect temporary barriers 602F-1, 602F-2 on one side of road 604, and temporary barriers 602F-3 and 602F-4 on another (e.g., opposite) side of road 604. Fence generation module 242 then sets out to define and generate fences for each pair of detected temporary barriers.

First, fence generation module 242 starts a fence generating routine, which may be triggered, for example, by the detection of the first/closest temporary barrier 602F-1 near road side 614. Fence generation module 242 may then determine a center of each applicable lane, which in the scenario shown in FIG. 6F includes center 636 of lane 606 and center 638 of lane 608. With lane centers 636 and 638 defined, fence generation module 242 is able to define offsets and angles of the temporary barriers 602F-1 to 602F-4.

Based on center 638, fence generation module 242 defines offset 640 representing a distance between temporary barrier 602F-1 and center 638. A distance 642 between temporary barriers 602F-1 and 602F-2 may be determined by fence generation module 242. Fence generation module 242 may determine offset 644 representing a distance between temporary barrier 602F-2 and center 638. Offsets 640, 644 and distance 642 may be sufficient for fence generation module 242 to define fence boundaries 620F and/or 622F. Additionally, fence generation module 242 may determine an angle 646 of the fence as the angle between fence boundary 620F and lane 608, e.g., the angle between fence boundary 620F and lane center 638. Angle 646 may be measured at any point between temporary barriers 602F-1, 602F-2. Additional angles such as angle 648 may be determined in connection with fence boundary 602F. Moreover, each individual offset, angle, and/or distance may be used by fence generation module 242 to determine whether any next-detected temporary barrier should be treated as being part of the same fence of temporary barriers 602F-1 and 602F-2. For example, if an offset, angle, and/or distance is beyond a defined threshold, fence generation module 242 may determine that the next-detected temporary barrier is not part of the same fence defined by boundaries 602F/622F.

To illustrate this aspect, FIG. 6F also shows temporary barriers 602F-3 and 602F-4 on an opposite side of the road (e.g., near road side 612) as temporary barriers 602F-1 and 602F-2. Offsets, angles, and distances may be determined by fence generation module in the same or similar manner as described in connection with temporary barriers 602F-1 and 602F-2, and as such as the offsets, angles, and distance are not marked with corresponding reference characters. Based on the measurements and determinations regarding the offsets, angles, and distance, fence generation module 242 may define another fence encompassing temporary barriers 602F-3 and 602F-4.

Fence generation module may, based on a plurality of measurements and corresponding determinations, determine that temporary barrier 602F-3 is not part of the fence defined for temporary barriers 602F-1 and 602F-2. For example, temporary barrier 602F-2 has a distance (e.g., along the x-axis as shown by coordinates in FIG. 6F) from temporary barrier 602F-3 that almost spans widths 626 and 628 combined. This distance may be deemed to be outside of a defined threshold pattern for extending a fence between objects have such a distance from one another. Additionally, based on the offsets of temporary barriers 602F-1 and 602F-2 relative to a common center such as center 638 and the offsets of temporary barriers 602F-3 and 602F-4 relative to a common center such as center 636, fence generation module 242 may determine that temporary barriers 602F-1 and 602F-2 are close to road side 614, whereas temporary barriers 602F-3 and 602F-4 are close to road side 612. By associating the temporary barriers to the closest side of the road, fence generation module 242 may determine that the pairs of temporary barriers (602F-1/602F-2 and 602F-3/602F-4) are on opposite sides of road 604 and separated by a distance such as distance 650 that is not within defined acceptable thresholds, and therefore should not be construed as being part of a common fence. Rather, each pair define their own respective fences. Similar determinations can be made using the various angle measurements.

Offsets may be further defined as being positive or negative offsets. For example, a barrier that is located to the right of center 638 may be categorized as having a positive offset, whereas a barrier located to the left of center 638 may be categorized by having a negative offset (or vice versa). For example, if, in FIG. 6F, barrier 602F-2 were left of center 638, barrier 602F-2 may be categorized as having a negative offset, whereas barrier 602F-1, which is to the right of center 636, may be categorized as having a positive offset. The delineation between positive and negative offsets may aid in additional fence generation determinations and/or other determinations.

With respect to determining whether to add a next detected temporary barrier such as temporary barrier 602F-5 to an existing fence such as the fence defined for temporary barriers 602F-1/602F-2, fence generation module may take into consideration a distance (e.g., along the y-axis as shown by coordinates in FIG. 6F) between the last temporary barrier of a fence, such as temporary barrier 602F-2, and the next-detected barrier such as temporary barrier 602F-5. For example, a distance measurement similar to distance 642 would be performed to determine a distance between temporary barriers 602F-2 and 602F-5. Moreover, both an offset of temporary barrier 602F-5 and a fence angle relative to center 638 may also be relied upon to make a decision as to whether or not barrier 602F-5 should be added to the same fence as barriers 602F-1/602F-2. For example, if the offset of barrier 602F-5 and/or the fence angle is within a define threshold relative to the offset of barrier 602F-2 and/or fence angle, then fence generation module 242 may determine that barrier 602F-5 should be part of the fence defined for barriers 602F-1/602F-5.

In some embodiments, to discern the characteristics and intent of adjacent fences, autonomous vehicle 100 may evaluate newly detected temporary barriers such as barrier 602F-5 shown in FIG. 6F based on a prior pattern of temporary barriers. For example, autonomous vehicle 100 may choose to proceed on a trajectory that most closely matches a prior trajectory. In the case of FIG. 6F, fence generation module may make a determination that barrier 602F-5 is within an acceptable offset/distance/angle threshold of barrier 602F-2 so as to treat barrier 602F-5 as being part of the same trajectory.

The fences shown in each of FIGS. 6A-6E may be defined in the manner shown in and described in connection with FIG. 6F. With reference to FIGS. 6A and 6B, distances between adjacent barriers 602A-1 through 602A-5 may be measured and used by fence generation module 242 to make a determination that barriers 602A-1 to 602A-5 should be part of the same fence 618A. With reference to FIG. 6C, angle measurements and determinations as described in connection with FIG. 6C may be utilized to determine that barrier 602C-3 is part of fence 618C because an angle of fence boundaries 620C/622C near barrier 602C-3 is within an acceptable threshold as compared to angle measurements for barriers 602C-1 and/or 602C-2. With reference to FIG. 6D, barrier 602D-5 may be determined to be a part of fence 618D due to its distances relative to barriers 602D-4, 602D-6, and/or 602D-7. For example, determining that barrier 602D-5 is part of fence 618D may also be based on extrapolations from previous barriers, such as the relationship between barriers 602D-3 and 602D-4. With reference to FIG. 6E, offset measurements and determinations serve as a basis for: (i) excluding temporary barriers 602E-10 and 602E-11 from the fence 618E, and (ii) defining a separate fence for temporary barriers 602E-10 and 602E-11.

In some implementations, a center of a temporary barrier may be used as a measuring point, whereas in other implementations sides and/or edges of a temporary barrier may be used as measuring points, and/or combinations thereof. In some embodiments, fence generation module 242 may be configured to perform interpolation to determine measurements, for example to fill gaps in data, such as in scenarios where sensors 202 may malfunction, sensor data from sensors 202 may not be returned, and/or sensors 202 have reached their physical detection limit(s). The interpolation may be based on historical data, rules, and/or other learned patterns, for example.

Fence generation module 242 may also be configured to respond to a variety of other real-world scenarios, such as if an adjacent vehicle on the road passes in front of a temporary barrier that is part of a string of temporary barriers such that autonomous vehicle 100 may not detect the temporary barrier occluded by the passing vehicle. In such cases, autonomous vehicle 100 may use past information to infer or otherwise deduce that a barrel was present. For example, if a next barrel is detected in a short timeframe after the most prior barrel (even if an intervening barrel was skipped or occluded from detection), it may be determined that a barrel was present and was obstructed momentarily, such as by the passing vehicle.

Additionally, contextual data such as map data 652 may be used in conjunction with the offset/angle/distance measurements and determinations to make further determinations, for example to help determine an intent of adjacent barriers. For example, if an exit ramp is present between barrier 602F-2 and 602F-5, this contextual knowledge may be used to not treat barrier 602F-5 as part of the fence defined for barriers 602F-1/602F-2. These types of aspects are further described in connection with FIGS. 7A and 7B.

Figure 7A:
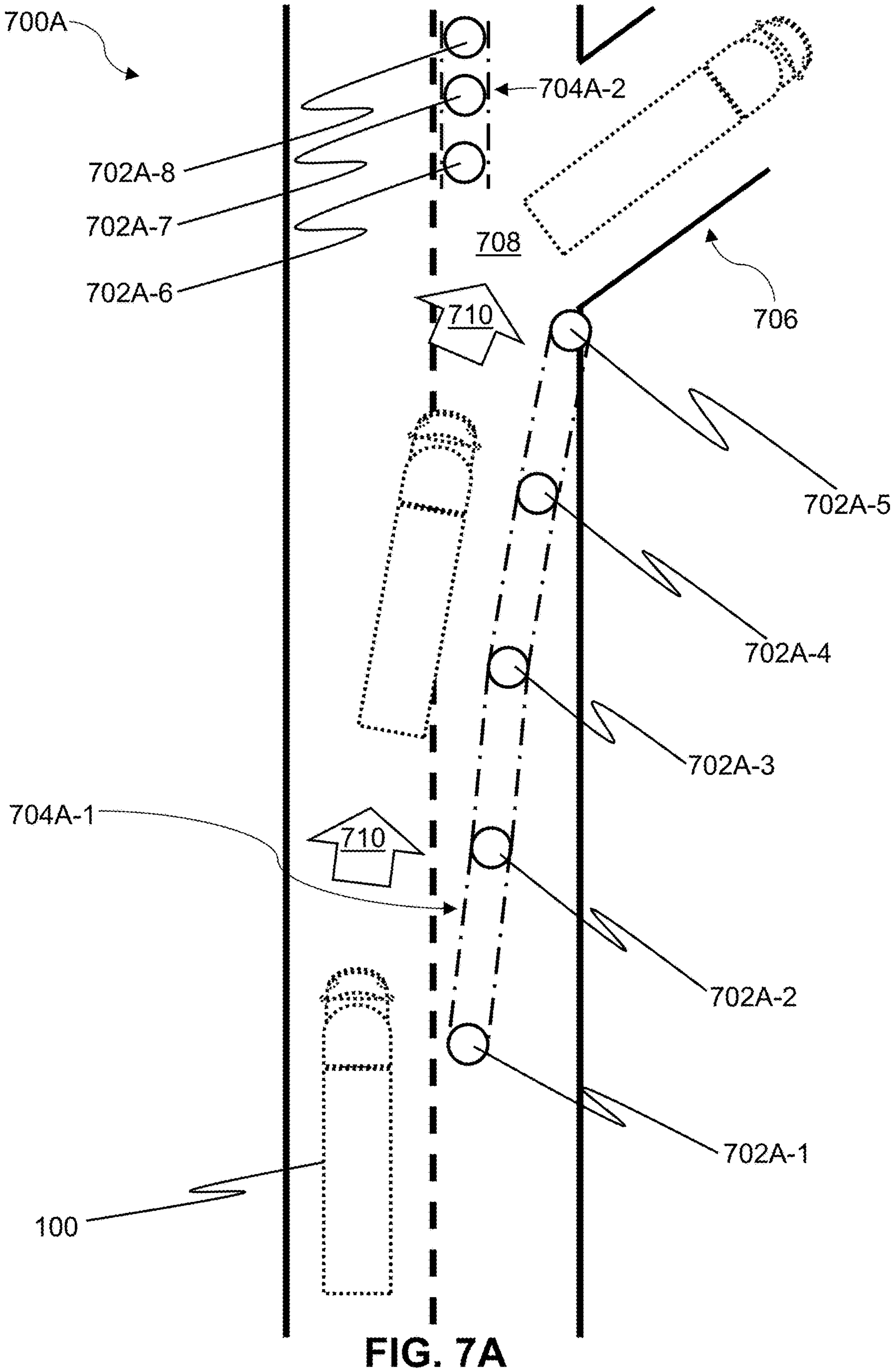
FIG. 7A is an example illustration of a temporary barrier exit ramp configuration according to one embodiment of the present disclosure.
Figure 7B:
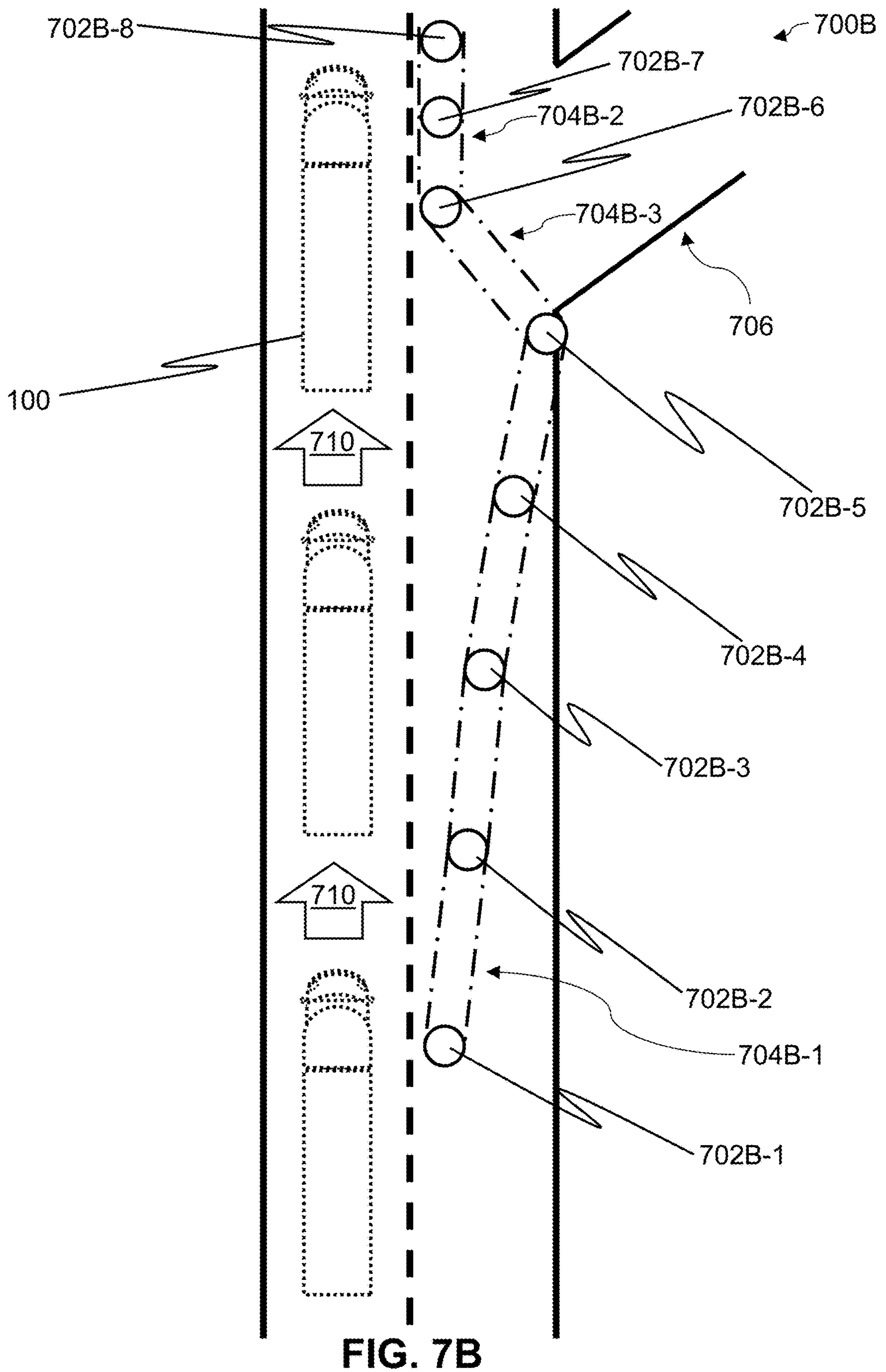
FIG. 7B is an example illustration of a temporary barrier fenced exit ramp configuration according to one embodiment of the present disclosure.

FIGS. 7A and 7B illustrate additional scenarios that autonomous vehicle 100 may face while driving on a road, and how contextual analysis utilizing external data in addition to the measurement data described herein provides for virtual fence generation that accurately reflects the real-world intent of temporary barriers placed on a road surface. For example, in the case of a highway or other stretch of road that has an exit such as an exit ramp (e.g., an off-ramp), autonomous vehicle 100 may be faced with a plurality of determinations to make with respect to any temporary barriers that may be present, including: (1) are adjacent strings of temporary barriers near the exit part of the same fence? and/or (2) are adjacent strings of temporary barriers near the exit part of unlinked fences (e.g., two or more fences that are intended to be separate and distinct from one another)? As described herein, some of the challenges of determining intent and navigating around objects on a road surface include using map and/or angle information to connect fences in relation to road features such as exit ramps. FIGS. 7A and 7B represent how context such as external map data and highway data (e.g., where exit ramps are located) may be utilized and implemented in conjunction with the measurement techniques described herein (e.g., see FIG. 6F, for example) to further enhance fence determinations.

FIG. 7A is an illustration of an example exit ramp scenario 700A in which temporary barriers 702A-1, 702A-2, 702A-3, 702A-4 and 702A-5 have been determined to define fence 704A-1, and temporary barriers 702A-6, 702A-7 and 702A-8 have been determined to define another fence 704A-2. More specifically, FIG. 7A represents a scenario in which there may be road construction that closes certain lanes, but an exit ramp 706 is present to permit vehicles to exit. Using the measurement and determination techniques described herein, autonomous vehicle 100 may determine that the distance between barriers 702A-5 and 702A-6 is outside an acceptable threshold for the two barriers to be part of the same fence. This determination, coupled with contextual exit ramp data, may be utilized and implemented to generate separate fences 704A-1 and 704A-2, e.g., two separate and distinct fences. This may further aid in determining that gap 708 present between fence 704A-1 and fence 704A-2 is a gap which is intended to be able to be entered despite the presence of barriers such as barriers 702A-5 and 702A-6. Thus, while autonomous vehicle 100 would not be able to cross either of fence 704A-1 and fence 704A-2 individually, autonomous vehicle 100 is permitted to enter gap 708 located between fence 704A-1 and fence 704A-2 to exit from exit ramp 706. Travel path 710 represented by the arrows shown in FIG. 7A illustrate how autonomous vehicle 100 traverses relative to fence 704A-1 and fence 704A-2. The contextual exit ramp data, combined with the measurement data and determinations of the temporary barriers, provides for an accurate fence/fences to be generated matching a real-world intent of the temporary barriers relative to the exit ramp.

FIG. 7B is an illustration of an example exit ramp scenario 700B in which temporary barriers 702B-1, 702B-2, 702B-3, 702B-4 and 702B-5 define fence 704B-1, and temporary barriers 702B-6, 702B-7 and 702B-8 define fence 704B-2. More specifically, FIG. 7B represents a scenario similar to that in FIG. 7A in which there may be road construction that closes certain lanes but an exit ramp 706 is present. However, despite there being an exit ramp 706, autonomous vehicle 100 determines that it is not permitted to proceed to exit ramp 706 because the temporary barriers for which fences 704B-1 and 704B-2 have been generated have been determined to be linked. This means that fence 704B-1 and 704B-2 are understood by autonomous vehicle 100 as effectively being one common fence. Moreover, map and/or highway data may add additional context to such a determination that exit ramp 706 is not intended to be used. In other words, that vehicles are not intended to pass between barriers 702B-5 and 702B-6. In this regard, an intermediate fence 704B-3 may be generated and implemented by fence generation module 242 between fence 704B-1 and fence 704B-2. Compared to the scenario shown in FIG. 7A, while there may be a physical, real-world gap present between temporary barrier 702B-5 and temporary barrier 702B-6 in FIG. 7B, autonomous vehicle 100 is not permitted to enter the gap cross because fence 704B-3 has been generated between fence 704B-1 and fence 704B-2, and autonomous vehicle 100 is not permitted, by rule, to cross a fence such as fence 704B-3. For example, FIG. 7B may represent a real world scenario where exit ramp 706 is shut down due to road work on the exit ramp, and the intent of barriers 702B-5 and 702B-6 is for vehicles to not exit using exit ramp 706.

Using the measurement and determination techniques described herein, for example in connection with FIG. 6F, autonomous vehicle 100 has determined that fences 704B-1 to 704B-3 are related because the intent of the temporary barriers is to preclude vehicles from exiting from exit ramp 706. Thus, while it may appear that temporary barriers 702B-1 to 702B-5 define one fence (e.g., fence 704B-1) and temporary barriers 702B-6 to 702B-8 define another separate fence (e.g., fence 704B-2), autonomous vehicle 100 has determined that the intent of temporary barrier 702B-6 is to block exit ramp 706. For example, comparing temporary barrier 702A-6 in FIG. 7A to temporary barrier 702B-6 in FIG. 7B, it is shown that temporary barrier 702B-6 extends more into the area of exit ramp 706 than does temporary barrier 702A-6. This difference may serve as the catalyst for fence generation module 242 determining that the intent of temporary barrier 702B-6 is to preclude usage of exit ramp 706. Another threshold for such a fence determination may be the proximity of temporary barrier 702B-6 to temporary barrier 702B-5. Once again comparing FIG. 7A to FIG. 7B, in FIG. 7A, temporary barrier 702A-6 is farther from temporary barrier 702A-5 than temporary barrier 702B-6 is to temporary barrier 702B-5 in FIG. 7B. Accordingly, fence generation module 242 may use a plurality of offset/angle/distance threshold determinations to determine an intent associated with the detected location/placement of temporary barriers within a road setting. In the implementation shown in FIG. 7B, this means that fence generation module 242 determines that fence 704B-1 is joined with fence 704B-2 via fence 704B-3 and fences 704B-1 to 704B-3 are treated as one fence that autonomous vehicle 100 is not permitted to cross. Travel path 710 represented by the arrows shown in FIG. 7B illustrate how autonomous vehicle 100 traverses relative to fences 704B-1 to 704B-3.

Additionally, as described herein, in each of the scenarios illustrated in FIGS. 7A and 7B, autonomous vehicle 100 may use map data in conjunction with the data acquired from its internal sensors to make determinations as to events such as exiting via an exit ramp. For example, data acquired via sensors 202 may be used to make a determination as to whether certain temporary barriers are intended to be part of one fence or part of another fence based on distance/offset thresholds as described herein, while also comparing the data acquired by autonomous vehicle 100 to map and/or highway data to arrive at an ultimate determination derived by the techniques described in connection with FIG. 6F.

For example, FIG. 6F shows how fence generation module 242 may determine connectedness of adjacent temporary barriers and/or fences if a threshold is within certain distance, offset, and/or angle thresholds, so as to determine if any given temporary barrier is a discrete object or is intended to convey a meaning such as do not cross and/or enter a certain area.

Fence generation module 242 may store in memory a last, or historical, fence to make determinations as to a new temporary barrier and/or a new fence. For example, if no new temporary barrier is detected, the current fence may be determined to have ended, and a detection of a new temporary barrier would be treated as the start of a new fence. In addition to distance and/or angle measurements, fence generation module 242 may also use time as a means of making intent determinations, such that time and distance/angle are used and implemented as part of the intent-determining process.

Real-world log data from test drives/test runs of autonomous vehicle 100 may be used to (i) determine the rules that define how distances, angles, and other temporary barrier aspects are determined with respect to fence parameters and calculations, and (ii) define rules for how intent is determined. The real-world log data may include video logs, and other sensor logs. The rules may be used to define the algorithms that are used to navigate autonomous vehicle 100 in virtual fence scenarios. For example, cameras of an autonomous vehicle may record the vehicle passing through a construction/closure area where one or more temporary barriers have been placed on the road surface. The video data may be used to set rules that define the types of temporary barriers that the autonomous vehicle will treat as potentially fence-defining temporary barriers (e.g., a first temporary barrier that triggers a start of a virtual fence being generated). Video data may also be used and implemented to define various distance and angle rules for determining fence geometry and/or other geometric relationships between objects such as temporary barriers and/or characteristics of the road. For example, measurements may be taken from obtained videos regarding lane size, lane markings, lane boundaries, and/or other road features (e.g., exit ramps).

The rules may further be set based on a plurality of real-world scenarios, such as a scenario where a plurality (e.g., ten) of temporary barriers have been placed on a road to close a lane, and a separate vehicle drives past the autonomous vehicle and blocks the autonomous vehicle from perceiving one or more of the temporary barriers while driving down the road. The autonomous vehicle may have detected temporary barriers one through of five, not detected temporary barriers six through seven, and then detected temporary barriers eight through ten. By analyzing video of such a scenario, rules may be set to control how the autonomous vehicle responds to a momentary gap in detected objects and how to interpret and react to such an event (e.g., how to manage occluded/blocked barriers). These rules can then be used to define the algorithms that are used to generate virtual fences and navigate autonomous vehicle according to such fences. Additionally, simulated driving data may be used and implemented to define such rules.

With reference to FIG. 4, there may be increased uncertainty regarding the location and/or type of temporary barriers and/or other objects that are far away from autonomous vehicle 100. Due to sensor limitations and/or other issues, sensors 202 may not be able to determine the location and/or type of objects present at long distances. Autonomy computing system 200 may be configured to assign less certainty to objects such as cones 304 that are far down the road than cones 304 that are closer to autonomous vehicle 100. Objects that are closer to autonomous vehicle 100 may be weighted more than far off objects when generating a fence. These types of issues can be mitigated/solved by constructing a fence using the measurements, context, and extrapolation techniques described herein. For example, in a scenario where an intermediate barriers within a string of barriers is occluded due to a passing vehicle, faulty sensor, etc., extrapolation relative to the prior barrier and any next-detected barrier that is within an acceptable threshold may be able to "fill in the blanks" for the occluded barrier such that a fence is maintained (e.g., the occluded barrier is not deemed to be an end to the fence).

Figure 8:
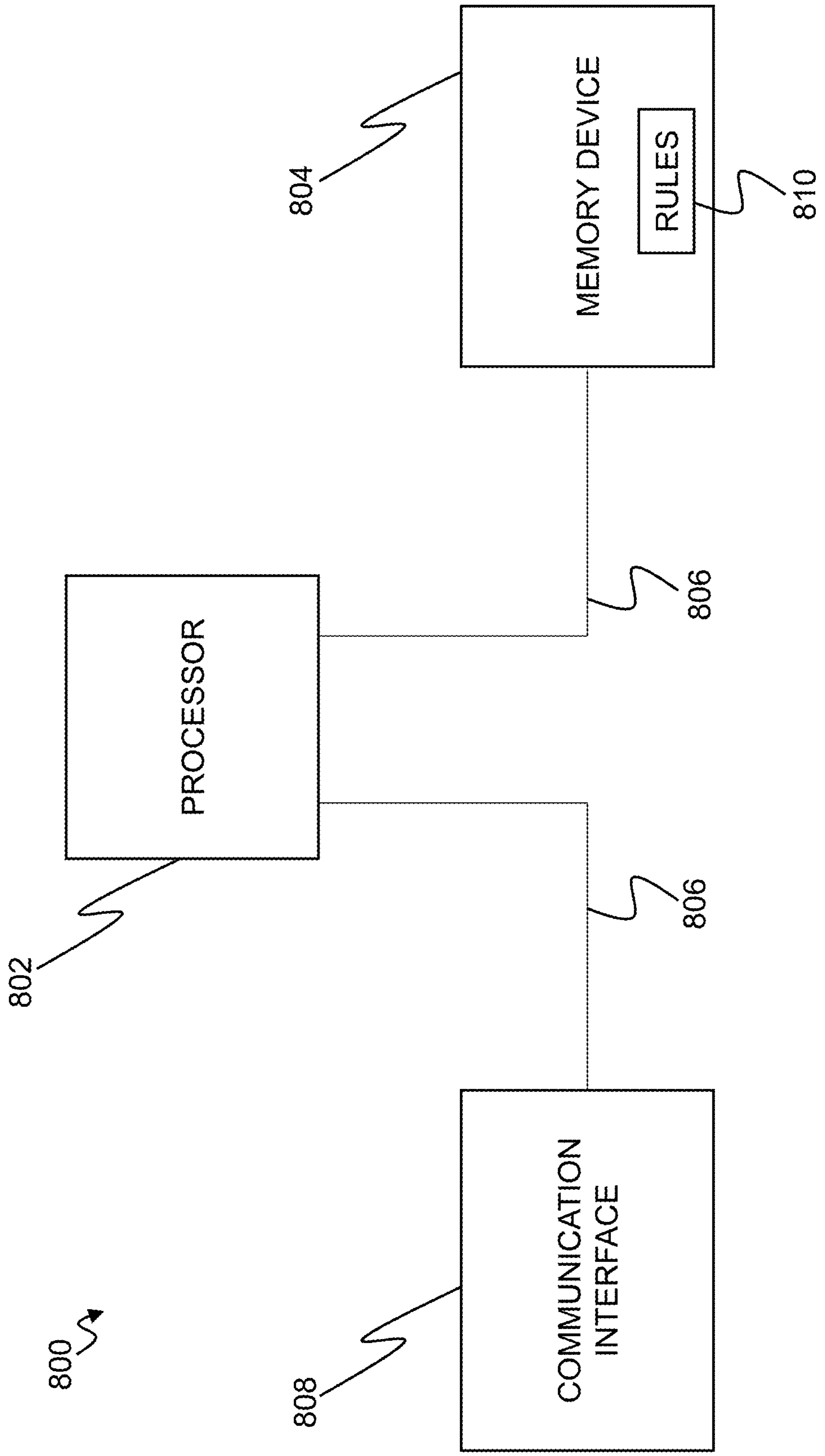
FIG. 8 is a block diagram showing an example configuration of an autonomy computing device according to one embodiment of the present disclosure.

FIG. 8 is a block diagram of an example computing device 800. Autonomy computing system 200 may be implemented with one or more computing device(s) 800. Computing device 800 includes a processor 802 and a memory device 804. The processor 802 is coupled to the memory device 804 via a system bus 806. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 804 includes one or more devices that enable information, such as executable instructions or other data (e.g., sensor data), to be stored and retrieved. Moreover, the memory device 804 includes one or more computer readable media, such as, without limitation, dynamic random access memory (DRAM), static random access memory (SRAM), a solid state disk, or a hard disk. In the example embodiment, the memory device 804 stores, without limitation, application source code, application object code, configuration data, additional input events, application states, assertion statements, validation results, or any other type of data. The computing device 800, in the example embodiment, may also include a communication interface 808 that is coupled to the processor 802 via system bus 806. Moreover, the communication interface 808 is communicatively coupled to data acquisition devices.

In the example embodiment, processor 802 may be programmed by encoding an operation using one or more executable instructions and providing the executable instructions in the memory device 804. In the example embodiment, the processor 802 is programmed to select a plurality of measurements that are received from data acquisition devices. In the example embodiment, rules 810 are stored in memory device 804. Rules 810 may include any/all of the rules described herein.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Some of the problems addressed herein include: inability of existing systems to (a) accurately determine an intent of objects such as temporary barriers used to designate construction areas and/or close lanes on roads, (b) accurately update a travel path of an autonomous vehicle using lane markings/sides of a road and/or temporary barriers placed on the road surface; and (c) safely and securely operate an autonomous vehicle while driving in a construction or other lane closure zone.

An example technical effect of the methods, systems, and apparatus described herein includes at least one of: (a) accurate generation of a virtual fence based on measurements and determinations of temporary barriers used to designate construction and/or close lanes/exits of a road; (b) use of contextual data such as map data, highway data, and/or other external data to determine and generate a fence;

(c) accurately determine intent of temporary barriers based on rules and/or other determined parameters; (d) updating a travel path of an autonomous vehicle in accordance with the generated virtual fence; and (e) improving safety and security of an autonomous vehicle while driving in a construction or other lane closure zone.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. The instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomy computing system of an autonomous vehicle for generating a virtual fence, the autonomy computing system comprising at least one processor in communication with at least one memory device, the at least one processor programmed to:

receive data of a plurality of temporary barriers on a road based upon analysis of sensor data from one or more sensors of the autonomous vehicle;

determine, based at least on individualized data for each barrier of the plurality of temporary barriers included in the received data, a lane closure intent associated with the plurality of temporary barriers;

construct, based on the determined lane closure intent, a virtual fence associated with the plurality of temporary barriers, the virtual fence delineating a section of the road in which the autonomous vehicle is restricted from driving; and autonomously control operation of the autonomous vehicle based on the virtual fence.

2. The autonomy computing system of claim 1, wherein the at least one processor is further programmed to:

determine the lane closure intent of two of the plurality of temporary barriers based on a distance between the two of the plurality of temporary barriers and offsets of each of the two of the plurality of temporary barriers relative to an offset reference.

3. The autonomy computing system of claim 1, wherein the at least one processor is further programmed to:

receive data of at least one additional temporary barrier; and determine whether the at least one additional temporary barrier belongs to a new virtual fence based on context associated with the at least one additional temporary barrier.

4. The autonomy computing system of claim 3, wherein the at least one processor is further programmed to:

determine the context based on a map of an environment in which the autonomous vehicle is traveling.

5. The autonomy computing system of claim 3, wherein the at least one processor is further programmed to:

determine whether an exit precedes the at least one additional temporary barrier.

6. The autonomy computing system of claim 1, wherein the at least one processor is further programmed to:

receive data of at least one additional temporary barrier; and determine whether the at least one additional temporary barrier belongs to a new virtual fence based on a previously determined virtual fence.

7. The autonomy computing system of claim 6, wherein the at least one processor is further programmed to:

determine whether the at least one additional temporary barrier belongs to the new virtual fence based on the at least one additional temporary barrier relative to an angle of the historical previously determined virtual fence.

8. The autonomy computing system of claim 6, wherein the at least one processor is further programmed to:

determine whether the at least one additional temporary barrier belongs to the new virtual fence based on a distance between the at least one additional temporary barrier and a last temporary barrier of the previously determined virtual fence and offsets of the at least one additional temporary barrier and the last temporary barrier relative to an offset reference of a traveling lane of the autonomous vehicle.

9. A computer-implemented method for generating a virtual fence via an autonomous vehicle using at least one processor in communication with at least one memory, the method comprising:

receiving data of a plurality of temporary barriers on a road based upon analysis of sensor data from one or more sensors of the autonomous vehicle;

determining, based at least on individualized data for each barrier of the plurality of temporary barriers included in the received data, a lane closure intent associated with the plurality of temporary barriers;

constructing, based on the determined lane closure intent, a virtual fence associated with the plurality of temporary barriers, the virtual fence delineating a section of the road in which the autonomous vehicle is restricted from driving; and autonomously controlling operation of the autonomous vehicle based on the virtual fence.

10. The method of claim 9, wherein the method is rule-based.

11. The method of claim 9, wherein rules of the rule-based method comprise intent determination rules and fence generation rules.

12. The method of claim 9, further comprising:

determining the lane closure intent of two of the plurality of temporary barriers based on a distance between the two of the plurality of temporary barriers and offsets of each of the two of the plurality of temporary barriers relative to an offset reference of a traveling lane of the autonomous vehicle.

13. The method of claim 9, further comprising:

receiving data of at least one additional temporary barrier; and determining whether the at least one additional temporary barrier belongs to a new virtual fence.

14. The method of claim 13, wherein the determining whether the at least one additional temporary barrier belongs to a new virtual fence is based on at least one of: (i) context associated with the at least one additional temporary barrier; and (ii) whether the at least one additional temporary barrier belongs to the new virtual fence based on a previously determined virtual fence.

15. One or more non-transitory computer-readable storage media for an autonomous vehicle, the one or more non-transitory computer-readable storage media comprising a plurality of instructions stored thereon that, in response to being executed, cause the autonomous vehicle to:

receive data of a plurality of temporary barriers on a road based upon analysis of sensor data from one or more sensors of the autonomous vehicle;

determine, based at least on individualized data for each barrier of the plurality of temporary barriers included in the received data, a lane closure intent associated with the plurality of temporary barriers;

construct, based on the determined lane closure intent, a virtual fence associated with the plurality of temporary barriers, the virtual fence delineating a section of the road in which the autonomous vehicle is restricted from driving; and autonomously control operation of the autonomous vehicle based on the virtual fence.

16. The one or more non-transitory computer-readable storage media of claim 15, wherein the instructions, in response to being executed, further cause the autonomous vehicle to:

determine the lane closure intent of two of the plurality of temporary barriers based on a distance between the two of the plurality of temporary barriers and offsets of each of the two of the plurality of temporary barriers relative to an offset reference of a traveling lane of the autonomous vehicle.

17. The one or more non-transitory computer-readable storage media of claim 15, wherein the instructions, in response to being executed, further cause the autonomous vehicle to:

receive data of at least one additional temporary barrier; and determine whether the at least one additional temporary barrier belongs to a new virtual fence based on context associated with the at least one additional temporary barrier.

18. The one or more non-transitory computer-readable storage media of claim 15, wherein the instructions, in response to being executed, further cause the autonomous vehicle to:

receive data of at least one additional temporary barrier; and determine whether the at least one additional temporary barrier belongs to a new virtual fence based on a previously determined virtual fence.

19. The one or more non-transitory computer-readable storage media of claim 18, wherein the instructions, in response to being executed, further cause the autonomous vehicle to:

determine whether the at least one additional temporary barrier belongs to the new virtual fence based on the at least one additional temporary barrier relative to an angle of the previously determined virtual fence.

20. The one or more non-transitory computer-readable storage media of claim 18, wherein the instructions, in response to being executed, further cause the autonomous vehicle to:

determine whether the at least one additional temporary barrier belongs to the new virtual fence based on a distance between the at least one additional temporary barrier and a last temporary barrier of the previously determined virtual fence and offsets of the at least one additional temporary barrier and the last temporary barrier relative to an offset reference of a traveling lane of the autonomous vehicle.

* * * * *